United States Patent [19]
Baxter et al.

[11] Patent Number: 6,128,010
[45] Date of Patent: Oct. 3, 2000

[54] ACTION BINS FOR COMPUTER USER INTERFACE

[75] Inventors: Paul Baxter, Framingham, Mass.; Bruce Leban, Redmond, Wash.; Brent Koeppel, Natick, Mass.

[73] Assignee: Assistive Technology, Inc., Newtown, Mass.

[21] Appl. No.: 09/109,149

[22] Filed: Oct. 6, 1997

Related U.S. Application Data

[60] Provisional application No. 60/054,904, Aug. 5, 1997, and provisional application No. 60/061,162, Oct. 6, 1997.

[51] Int. Cl.$^7$ ........................................................ G06F 9/00
[52] U.S. Cl. ............................................ 345/333; 345/339
[58] Field of Search ................................. 345/326, 333, 345/334, 339, 348, 349

[56] References Cited

U.S. PATENT DOCUMENTS

| | | | |
|---|---|---|---|
| 3,771,156 | 11/1973 | Watts et al. | 345/156 |
| 5,175,854 | 12/1992 | Cheung et al. | 709/100 |
| 5,561,811 | 10/1996 | Bier | 345/326 |
| 5,586,243 | 12/1996 | Barber et al. | 345/326 X |
| 5,611,040 | 3/1997 | Brewer et al. | 345/340 |
| 5,617,114 | 4/1997 | Bier et al. | 345/902 X |
| 5,625,783 | 4/1997 | Ezekiel et al. | 345/346 |
| 5,680,619 | 10/1997 | Gudmundson et al. | 345/302 X |
| 5,801,687 | 9/1998 | Peterson et al. | 345/302 |
| 5,862,379 | 1/1999 | Rubin et al. | 395/702 |
| 5,933,139 | 8/1999 | Feigner et al. | 345/338 |
| 5,940,078 | 8/1999 | Nagarajayya et al. | 345/346 |

FOREIGN PATENT DOCUMENTS

| | | |
|---|---|---|
| 0 564 845 A2 | 10/1993 | European Pat. Off. . |
| 0 622 725 A1 | 11/1994 | European Pat. Off. . |
| WO 95/25326 | 9/1995 | WIPO . |
| WO 96/30822 | 10/1996 | WIPO . |

OTHER PUBLICATIONS

IBM Systems Application Architecture: Common User Access Advanced Interface Design Guide pp. 25–29, Jun. 1989.

Johnson, Jeff., et al., "The Xerox Star: A Retrospective" Computer 22(9) : 11–26 & 28 (Sep. 1989).

*Primary Examiner*—Raymond J. Bayerl
*Assistant Examiner*—Cao H. Nguyen
*Attorney, Agent, or Firm*—Hamilton, Brook, Smith & Reynolds, P.C.

[57] ABSTRACT

A general purpose computer functions as an augmented assisted computing (AAC) system. The AAC system facilitates user access to, and control of, general purpose computer programs. In particular, the computing device is universally accessible to all users, regardless of physical ability.

81 Claims, 41 Drawing Sheets

ACTION BINS FOR COMPUTER USER INTERFACE

RELATED APPLICATIONS

This application claims priority to U.S. Provisional Application Ser. No. 60/054,904 which was filed on Aug. 5, 1997 pending, the entire teachings of which are incorporated herein by reference. This application also relates to U.S. Provisional Application Ser. No. 60/061,162 which was filed on even date of Oct. 6, 1997, the entire teachings of which are incorporated herein by reference.

BACKGROUND OF THE INVENTION

Certain classes of individuals are unable or find it difficult to use ordinary computers. These people include children and the handicapped. For example, a handicapped user may be unable to use, a keyboard or touchscreen with the same accuracy as a non-handicapped person. In addition, a person may be so severely handicapped that a computer synthesized voice must be used to communicate with others.

Prior art devices have focused mainly on communication devices. These devices are generally specialized hardware running a specialized application which is accessible to the handicapped user. The primary focus of these devices is communication—typically operating as an interface from the handicapped user to a listener. These devices are typically cumbersome for others, such as parents, teachers and therapists, to use with the user.

SUMMARY OF THE INVENTION

In accordance with preferred embodiments of the invention, a general purpose computer functions as an augmented assisted computing (AAC) system. The AAC system facilitates user access to, and control of, general purpose computer programs. In particular, the computing device is universally accessible to all users, regardless of physical ability.

In addition, a specific computer program operates to interface between the user and the computer for verbal and electronic communication with the environment. In addition, aspects of the invention provide the interface layer between the user and the computer operating system and other application programs.

A preferred embodiment of the invention is a computing system which provides an intuitive way to organize and access data stored in a computer. The system also provides a method of communication for those who find it difficult or impossible to communicate using standard techniques—through speech, writing, or typing.

The system software also provides an authoring tool. It allows the user to build applications, screens, activities, and computer interfaces in a personal and customized manner. The user can choose from an assortment of features and functions to create computerized solutions either from scratch or using provided examples.

The AAC software includes a suitable underlying structure and a picture-oriented interface so as to make each function easy to understand and learn. Navigating through the computer is simple, straight forward, and universally accessible to all users, regardless of physical ability. The software interface also understands many different input methods. The user can use a mouse, keyboard, voice commands, or touchscreen, as well switch devices and alternative pointing systems of various types. Furthermore, the input methods are not mutually exclusive, so another person, such as a parent, teacher or therapist, can use the system in a cooperative manner, alternating with the primary user.

The user can easily create environments, i.e., screens that combine all kinds of graphical images, movie clips, recorded sounds and music, pop-up labels, spoken text, background design, and links to other software. These environments enable the user to function effectively and easily, to communicate with others and even to control aspects of the user's physical surroundings.

BRIEF DESCRIPTION OF THE DRAWINGS

The above and other features of the invention, including various novel details of construction and combination of parts, will now be more particularly described with reference to the accompanying drawings and pointed out in the claims. It will be understood that the particular Universally Accessible Computing System embodying the invention is shown by illustration only and not as a limitation of the invention. The principles and features of the invention may be embodied in varied and numerous embodiments without departing from the scope of the invention.

DETAILED DESCRIPTION OF PREFERRED EMBODIMENTS OF THE INVENTION

In accordance with a preferred embodiment of the invention, the user interfaces with the computer through environment windows. Each environment is a window that represents at least one function executable by a user. Through environments, selecting an object, just like pressing a button, causes an action to happen. There are many different types of actions that occur, as will be described in detail below.

By customizing and editing an environment, the user can decide how it is to look, which objects to include, and exactly what each object is to do. The AAC software includes an intuitive interface to make constructing a new environment using the software as easy as using it.

Many functions can be modifiable by users through a variety of input devices. A parent, teacher, or therapist can collaborate with a user to create custom screens that are tailored to individual needs and activities. Visual, auditory, and language tools, together with a powerful and flexible interface enhances communication, organizes complex information, and provides a pathway to all types of learning.

Figure 1:
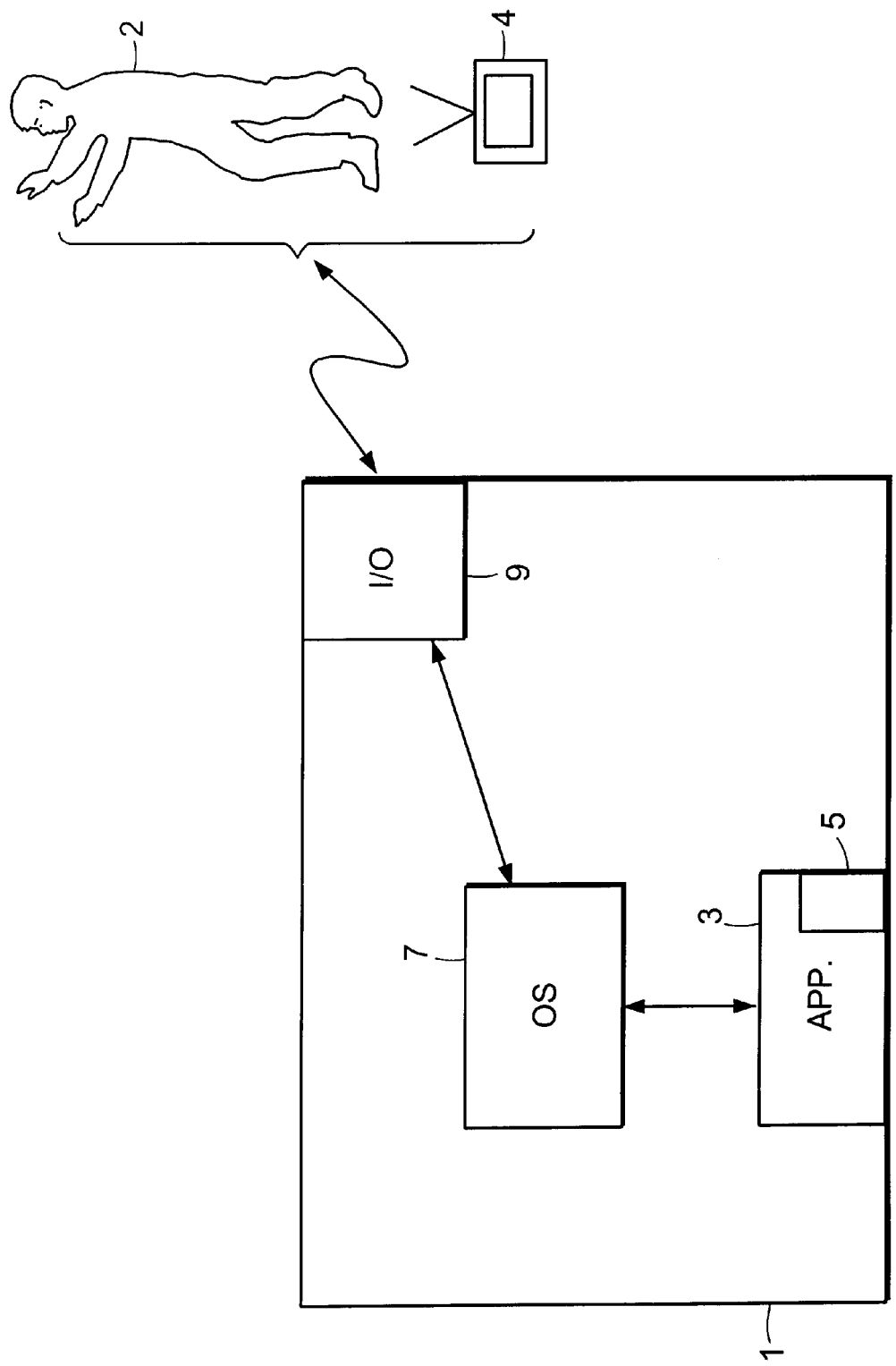
FIG. 1 is a schematic diagram of a preferred computing system in accordance with the invention.

FIG. 1 is a schematic diagram of a preferred computing system in accordance with the invention. In a preferred embodiment of the invention, the general purpose computer 1 operates a graphical operating system 7, but the invention can be embodied in any computer. A particular computer suitable for practicing the invention is the Freestyle computer, a MacOS-compatible computer commercially available from Assistive Technology, Inc. of Chestnut Hill, Mass.

Through the operating system 7, a software application 3 operates on data structures stored in memory and modifiable by the user. The stored data structures are manifested as environments and objects. An input/output subsystem 9 interfaces the computer 1 with people 2 and things 4. A particular embodiment of the AAC software is the Companion software package, version 1.0, commercially available from Assistive Technology, Inc. The software package is distributed on a computer readable medium, such as floppy disk, hard disk or CD-Rom.

Figure 2:
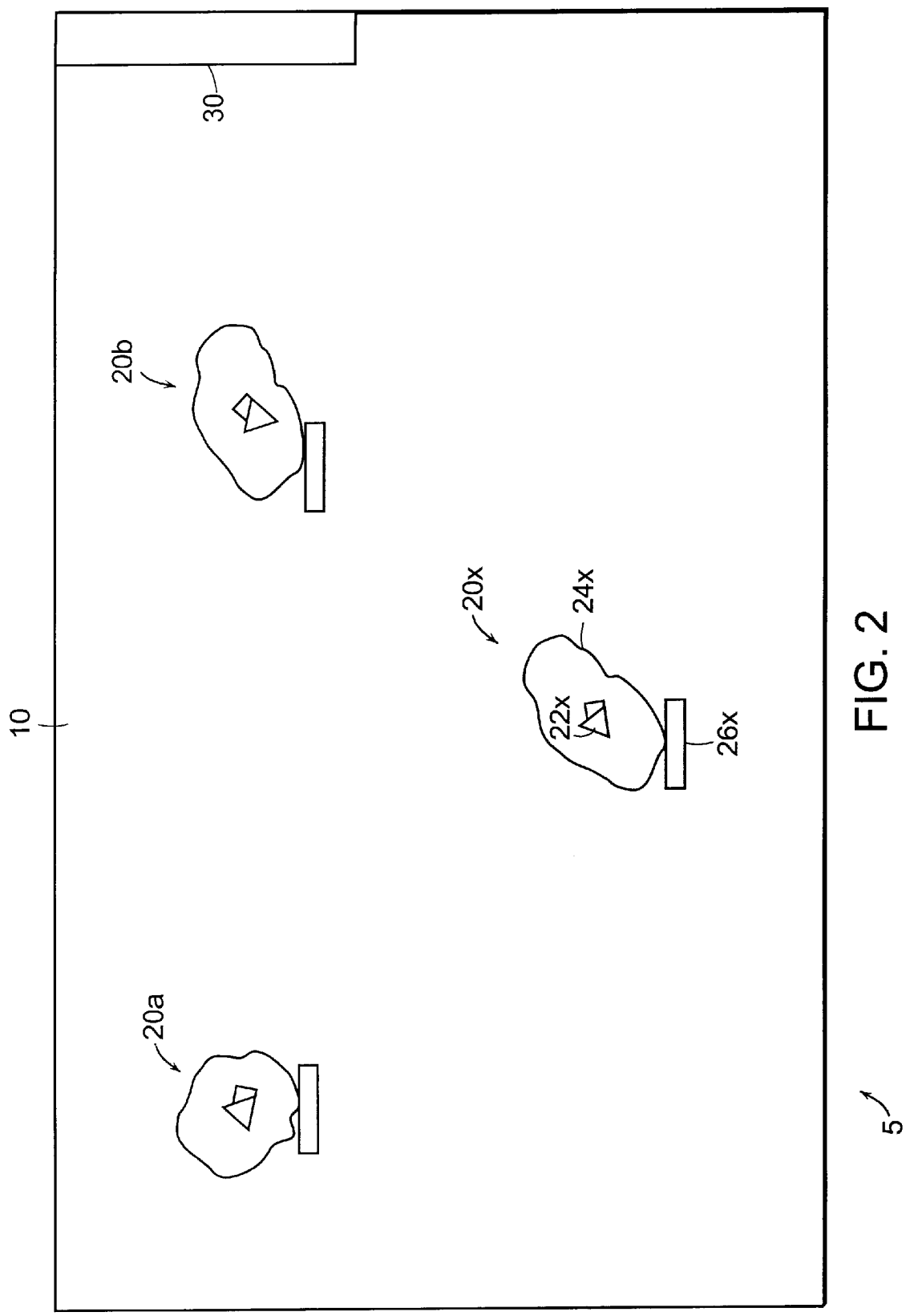
FIG. 2 is a screen image manifestation of an environment in accordance with the invention.

FIG. 2 is a screen image manifestation of an environment in accordance with the invention. As illustrated, an environment 5 includes a background 10, a plurality of objects 20a,20b,20x, and a tool bar 30. An object 20x includes an image 22x, a shape 24x and a label 26x. The objects 20 have a separate draw and scan order, as will be described in greater detail below.

Figure 3:
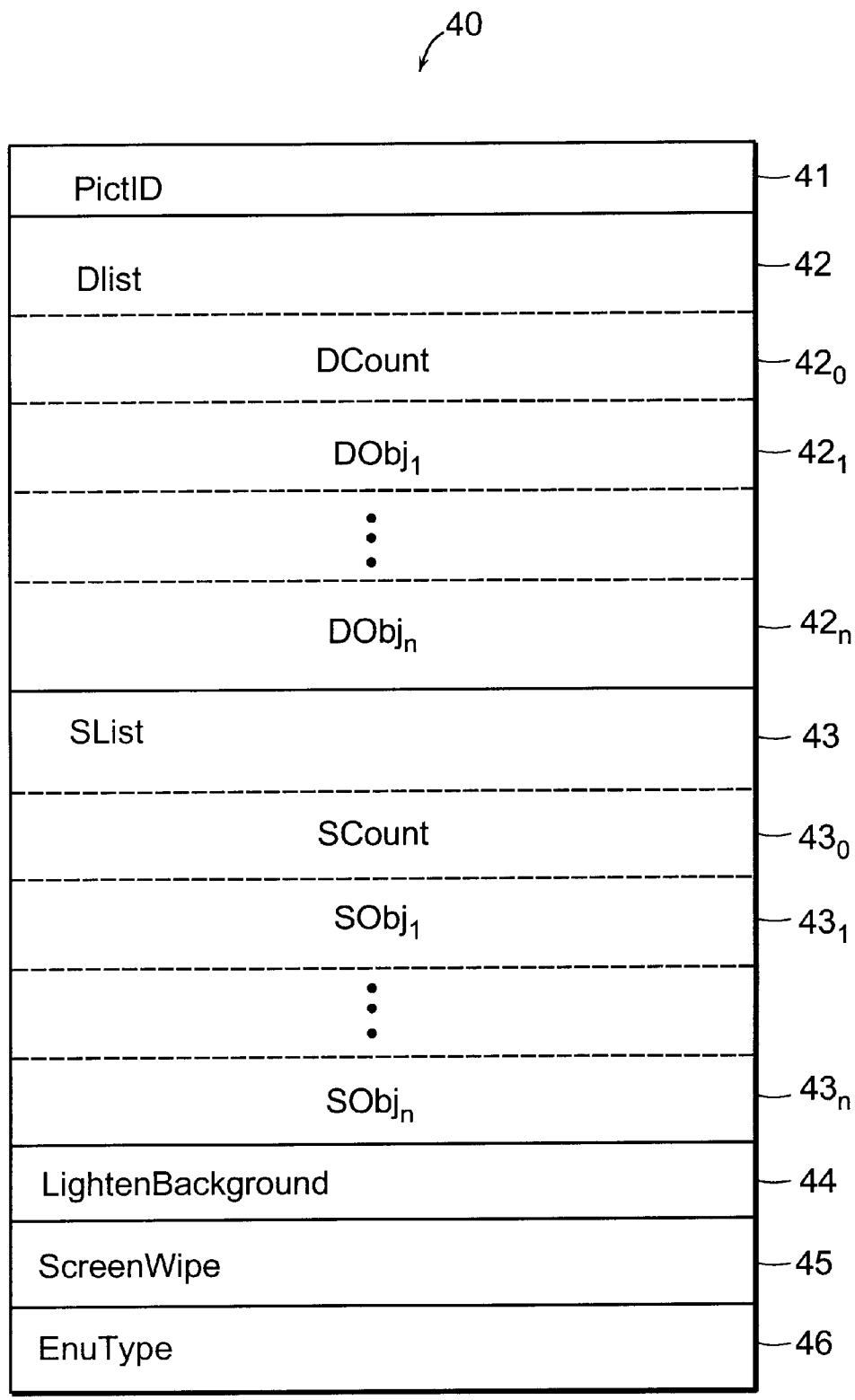
FIG. 3 is a schematic diagram of an environment data structure.

FIG. 3 is a schematic diagram of an environment data structure. The environment data structure 40 includes a picture ID field (PictID) 41, an object draw list (DList) 42, an object scan list (SList) 43, a lighten background (LightenBackground) flag 44, a screen wipe (ScreenWipe) data field 45, and an environment type (EnvType) field 46. The PictID field 41 stores an identification number for a graphics image to be used as the background for the environment. The LightenBackground flag 44 indicates whether the background colors are to be washed out with white. The ScreenWipe field 45 stores an encoded data value which indicates how the environment image is to be drawn over by a subsequent environment image. The EnvType field 46 stores an encoded data value which indicates the type of environment, for example: normal, edit, scrapbook, preferences, toolbar and readonly. Both object lists 42, 43 include, at the head of the list $42_0$, $43_0$, a count of the number of drawn or scanned (DCount, Scount) objects in the list. In addition, ID numbers of objects to be drawn or scanned are stored in the list (DObj, SObj) $42_1, \ldots, 42_N, 43_1, \ldots, 43_N$.

Figure 4:
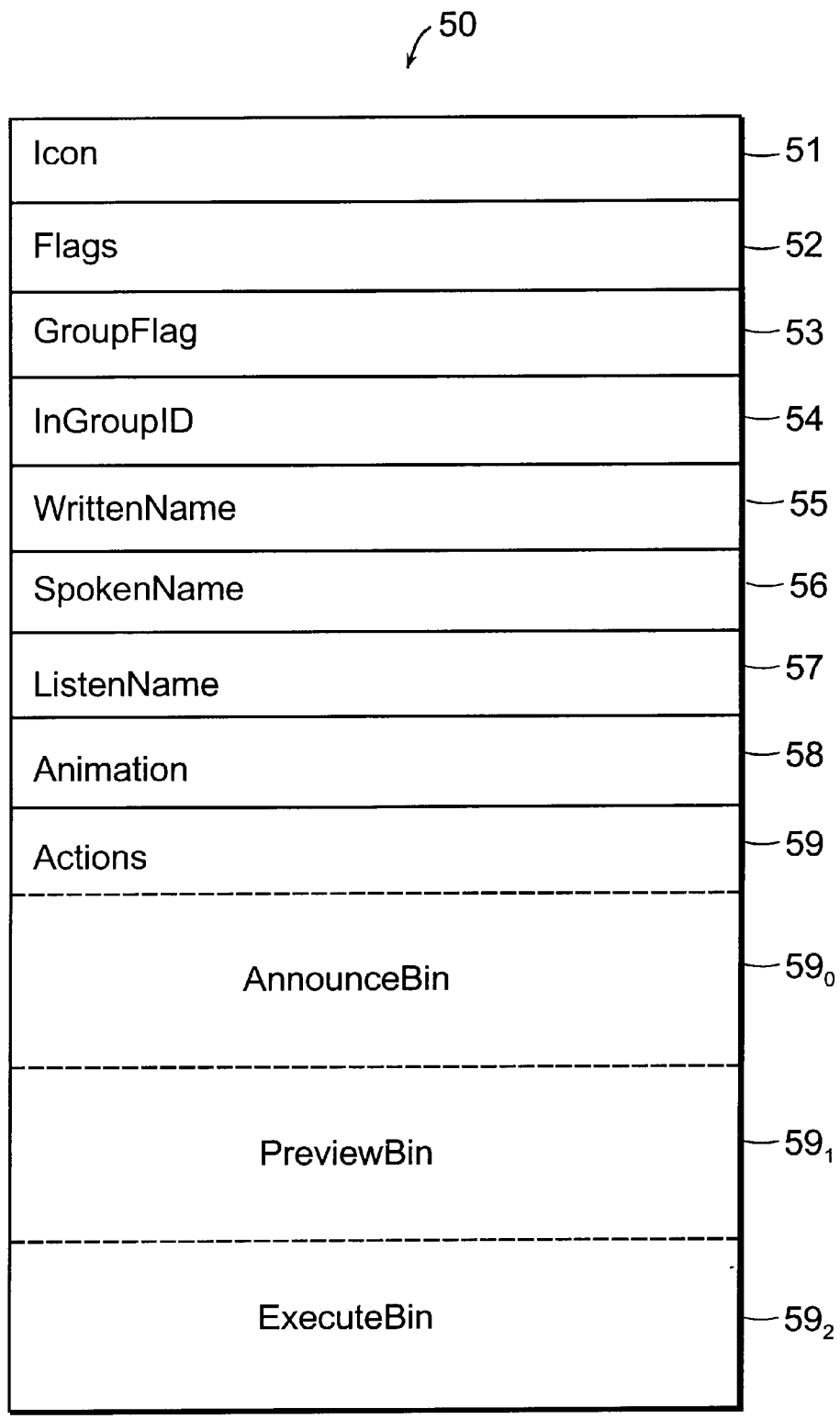
FIG. 4 is a schematic diagram of a data structure defining an object.

FIG. 4 is a schematic diagram of a data structure defining an object. An object data structure 50 includes an icon definition field (Icon) 51, object flags (Flags) 52, a group flag (GroupFlag) 53 to indicate whether this object is in a group, a field for the ID number of the group containing this object (InGroupID) 54, a written name (WrittenName) field 55, a spoken name (SpokenName) field 54, a listened for name (ListenName) field 57, and an animation flag 58. The Icon field 51 can include a number of sub items. For example, the icon field 51 can identify an image to use as an icon, the shape of the icon, and other display characteristics. Distinct written, spoken and listen name fields are provided for flexibility. For example, the spoken and listen names may be phonetically spelled or adapted to a particular user's pronunciation abilities.

An object also includes actions 54 to be performed. These actions are stored in bins. An announce bin 59, stores actions which result from the cursor being aligned with the object on the screen. A preview bin 59, stores actions to be performed by the object upon a single click (selection) of the object icon on the screen. An execute bin 592 stores actions which are performed by the object in response to a subsequent click (selection) of the object icon on the screen. Each bin can contain an ordered list of actions to be performed in order. Preferably, the announce bin 590 stores statically-defined automatic actions. Furthermore, if the execute bin $59_2$ is empty, the actions of the preview bin $59_1$ are repeated so the user does not have to duplicate actions when they are the same.

In addition, when using the environment, the user can request that the bin actions be merged such that all the corresponding bin actions are taken as one bin. Common actions between merged bins are automatically reduced to a single action so they are not duplicated. For example, it may be desirable to merge the actions in the announce bin $59_1$ and preview bin $59_2$ to promote learning. In comparison, the preview bin $59_1$ and execute bin $59_2$ can be merged to promote efficiency in operating the computing system.

Figure 5:
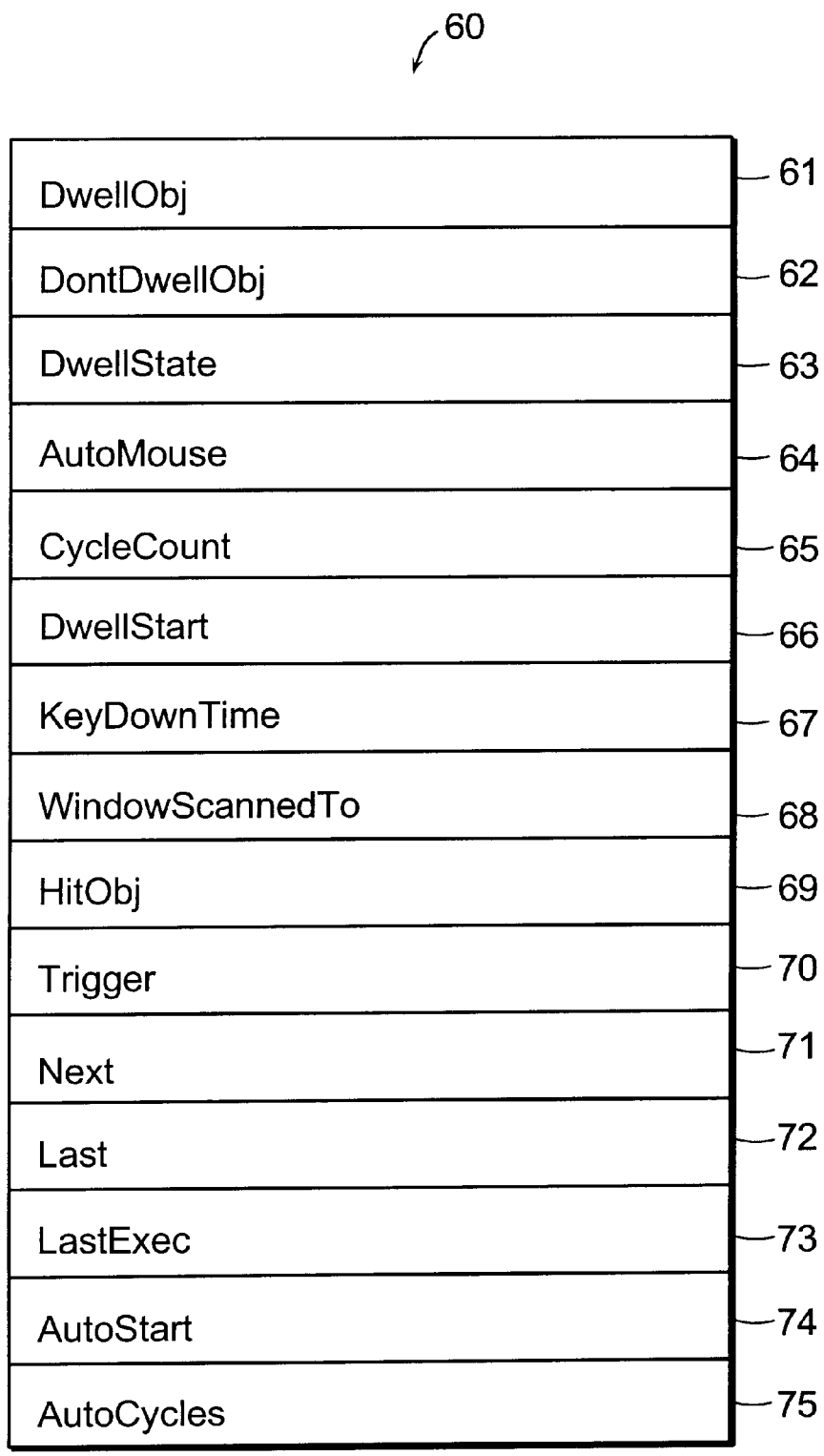
FIG. 5 is a schematic diagram of global variables used by the application program.

FIG. 5 is a schematic diagram of global variables used by the application program. The data structure 60 includes a dwell object (DwellObj) pointer field 61, a do not dwell Object (DontDwellObj),flag 62 and a dwell state (DwellState) field 63. Also includes is an automatic mouse (AutoMouse) flag 64, a cycle count (CycleCount) counter 65, and a dwell start (DwellStart) time field 66. Furthermore, the global variables include a key down (KeyDown) time field 67, a window scanned to (WindowScanTo) pointer field 68, a hit object (HitObj) pointer field 69 and a trigger flag 70. A next mouse position (Next) field 71, a last mouse position (Last) field 72 and a last executed object (LastExec) pointer field 7. are stored in the global data structure 60. Finally, an AutoStart time field 74 and an AutoCycles counter 75 are stored in the global data structure 60.

Figure 6:
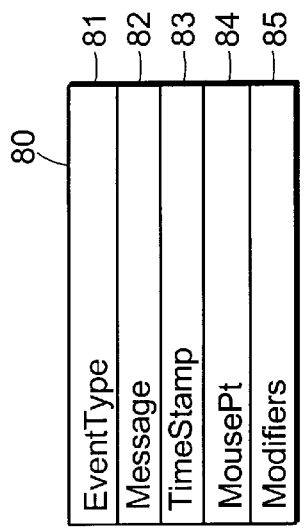
FIG. 6 is a schematic illustration of an event data structure in accordance with a preferred embodiment of the invention.

FIG. 6 is a schematic illustration of an event data structure in accordance with a preferred embodiment of the invention.

A preferred embodiment of the invention uses Apple Macintosh events which store data in an event record structure 80. The structure 80 is well known and includes an event type (EventType) field 81, a message (Message) field 82, a time stamp (TimeStamp) field 83, a mouse point (MousePt) field 84 and modifier (Modifier) flags 85.

Figure 7:
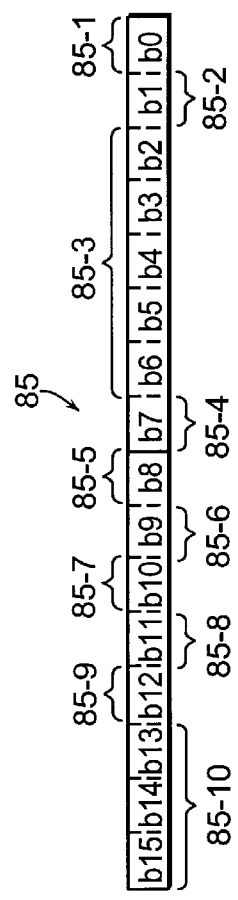
FIG. 7 is a schematic illustration of the modifier field 85 of FIG. 6.

FIG. 7 is a schematic illustration of the modifier field 85 of FIG. 6. The definitions of these files are well known. In particular, bit 0 (b0) is defined as an active window flag; bit 1 (b1) is defined as a system-application transition flag 85-2; bits 2–6 (b2–b6) are an unused bit field 85-3; bit 7 (b7) is defined as a button state flag 85-4; bit 8 (b8) is defined as a command key down flag 85-5; bit 9 (b9) is defined as a shift key down flag 85-6; bit 10 (b10) is defined as a caps lock key down flag 85-7; bit 11 (b11) is defined as an option key down flag 85-8; bit 12 (bit12) is defined as a control key down flag 85-9; and bits 13–15 (b13–b15) are an unused bit field 85-10.

Data stored in these and other data structures drive the AAC software. Using these data structures, the AAC system can load environments and execute objects selected by the user. These data structures can be created and modified by'the user using the AAC software. In other words, the AAC software provides a bootstrap through environments and objects which allow the user to modify, and thus customize, the AAC software itself.

A new environment can be created by dragging and dropping a background from an environment to an object. The background is used to create a new environment. The current object is then linked to the new environment. If the current object does not already have an icon, a thumbnail image of the background is used as the object icon.

Figure 8:
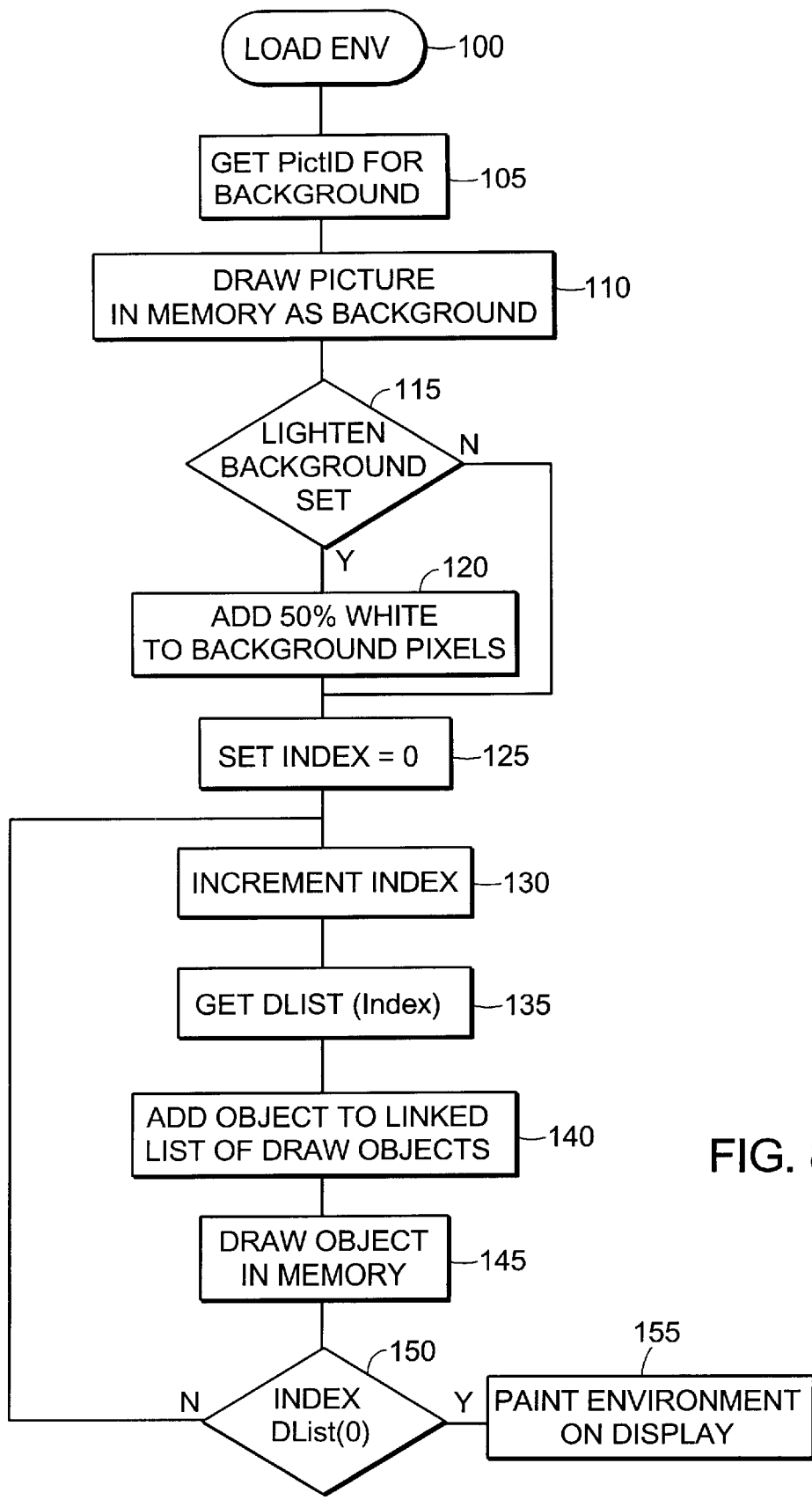
FIG. 8 is a flowchart of a load environment function. The load environment function 100 operates on the environment data structure 40 of FIG. 3.

FIG. 8 is a flowchart of a load environment function. The load environment function 100 operates on the environment data structure 40 of FIG. 3. At step 105, the image identified by the PictID field 41 is accessed for the background image. At step 110, the image is drawn in memory as the background. At step 115, the LightenBackground flag 44 is checked. If the LightenBackground flag 44 is set, then processing continues to step 120 where 50% white is added to each background pixel not behind an invisible object; otherwise, processing jumps to step 125. By not lightening the background behind an invisible object, the user can use the lightening background aspect to reveal invisible objects. From step 120, processing also continues to step 125.

At step 125, an index value is initialized to zero. At step 130, the index value is incremented and at step 133, the object draw list (DList) 42 is accessed to obtain the object to draw. At step 140, that object is added to a linked list of draw objects maintained in memory. At step 145, the object is drawn over the environment background in memory. It should be noted that when multiple objects overlap, the last drawn is the first visual object and the first drawn is the most hidden object.

At step 150, the next value is compared against the draw counter $42_0$. If the end of the list has not been reached (i.e., the index value is less than DList (0) $42_0$, control returns to step 130. Once the draw list has been exhausted, control continues to step 155 when the environment is painted onto the display.

Figure 9A:
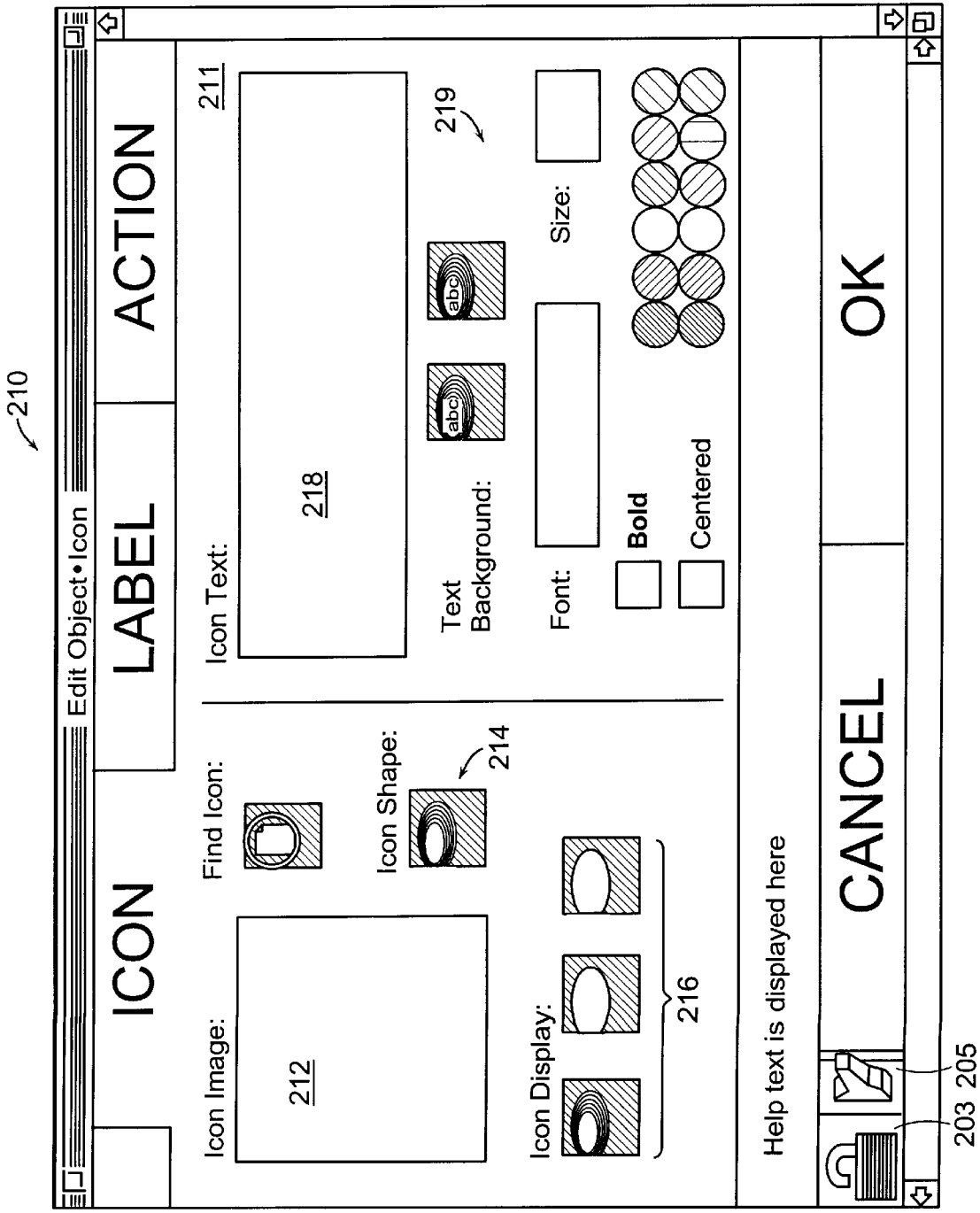
FIGS. 9A–9C are screen views of edit object environments in accordance with preferred embodiments of the invention.
Figure 9B:
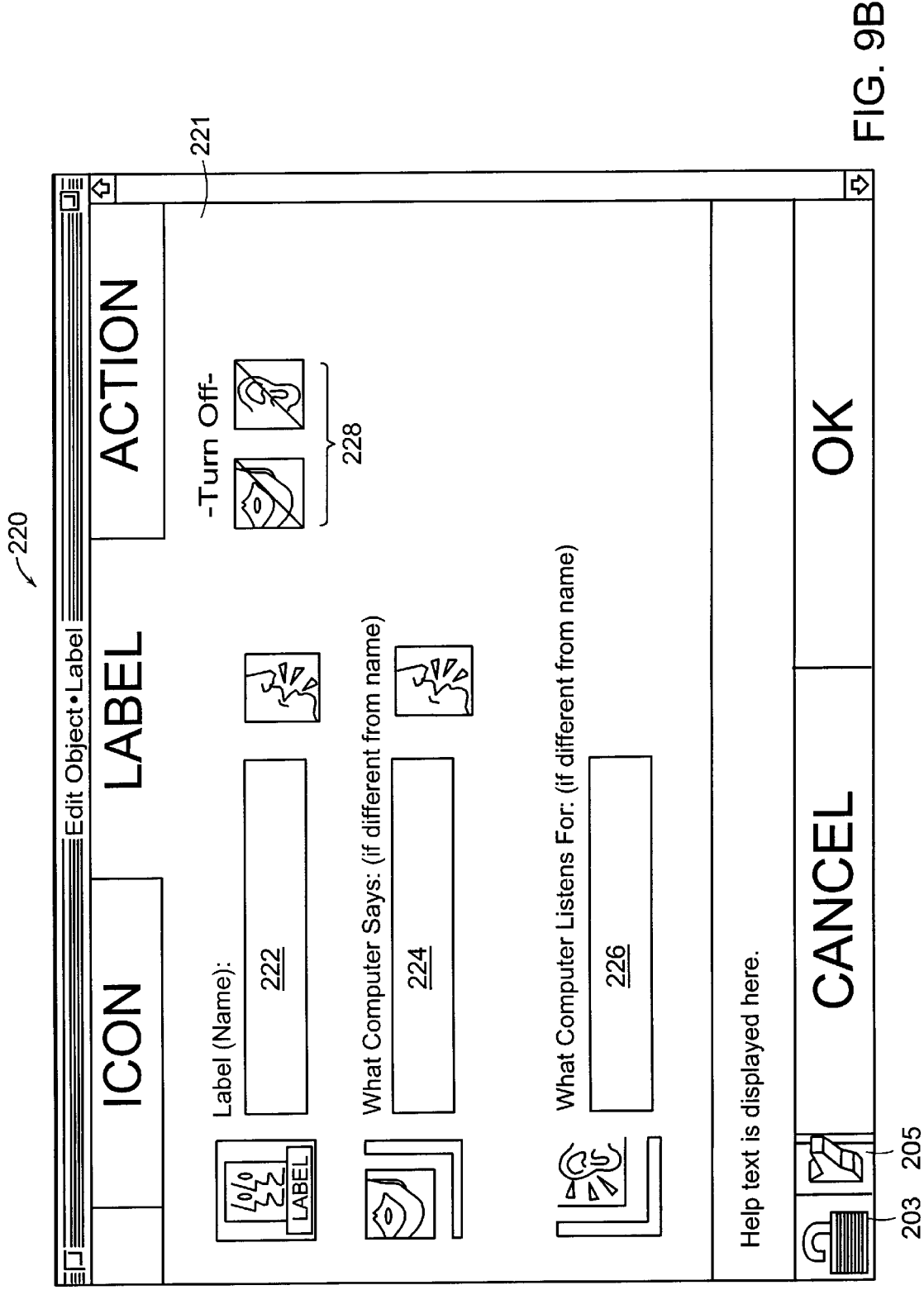
Figure 9C:
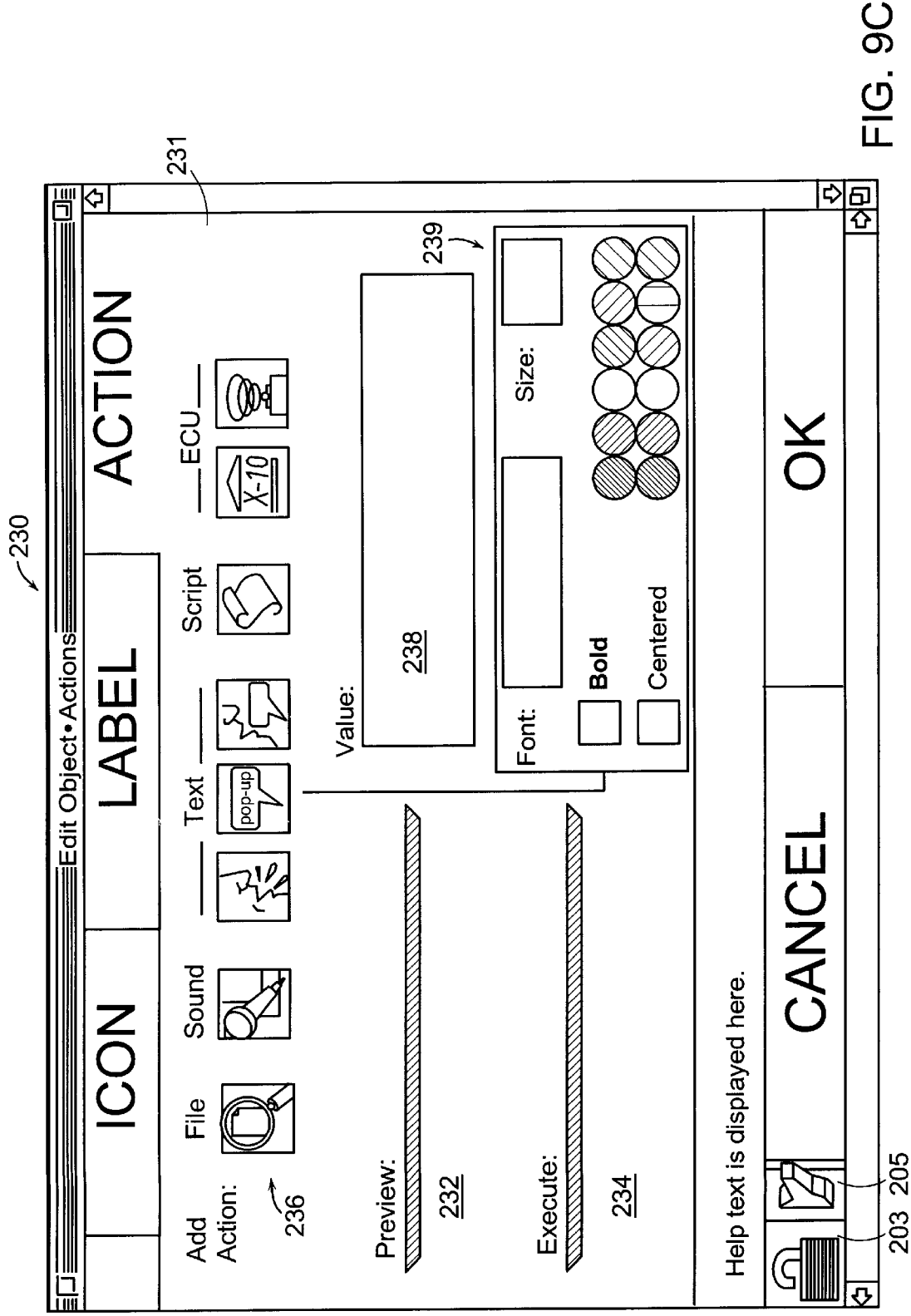

One example of an environment is an edit object environment. FIGS. 9A–9C are screen views of edit object environments in accordance with preferred embodiments of the invention. Each screen view is preferably a distinct environment. A user can use these environments to modify the object data structure 50 (FIG. 4). Each environment includes an execute-only (protected) object icon 203 and an object active icon 205 to set bits in the Flags field 52 of the object data structure 50. Similar environments can be used to modify other data fields to, for example, reflect user preferences.

FIG. 9A is a screen view of an edit object icon environment. The environment 210 has a solid color background image 211 with all text and graphics added as objects. These objects include an icon image box 212. The icon image is used as a picture of the object, scaled to fit an area. An image file can be dropped or pasted into the field to create the object's icon, or can be selected by browsing the computer hard drive for an image file. A unique identification number for the icon image is stored in the icon field 51 of the object's data structure 50.

An icon shape radio button 214 facilitates selection of an object's highlight region. In accordance with the preferred embodiment of the invention, the highlight region is a border which can be either rectangular or the shape of the object icon itself. The value from the icon shape selection is stored in the icon data field 51. Icon display radio buttons 216 allow the user to select how the object's icon will appear against the background image. Normally, the object's icon will be visible. However, the user may select that only the outline of the icon be displayed or make the object invisible to create a "hot spot" on the background.

An icon text dialog box 218 allows the user to type text which is added to the object's image. If, for example, the object is not assigned an image, this text becomes the object's icon. Unlike an icon label, discussed in more detail below, the icon text is always visible. By selecting text preferences 219, the user can select an opaque background for the icon text or transparent background, a font of a particular font size, bolding and centering, and text color.

FIG. 9B is a screen view of an edit object label environment. Again, the environment 220 has a solid color background image 221 with all text and graphics added as objects. These objects include a label dialogue box 222, a spoken name dialog box 224 and a listened for dialog box 226 which provide data to the WrittenName 55, SpokenName 56 and ListenName 57 data fields of the icon data structure 50. Also provided are radio buttons 228 to turn off speaking and listening functions of the computer.

FIG. 9C is a screen view of an edit object actions environment. As above, the environment 230 has a solid color background image 231 with all text and graphics added as objects. Through this environment 230, a preview dialog box 232 and an execute dialog box 234 provide an interface to allow the user to modify data in the preview bin $59_1$ and the execute bin $59_2$ of the icon data structure 50. In accordance with a particular preferred embodiment of the invention, the announce bin $59_0$ is predefined to highlight the objects border in a user-configurable color (e.g., blue). At the users preference, the announce bin $59_0$ can cause the spoken name of the object to be synthesized, the object's label to be displayed, or a sound to be played. Icons 236 for actions which can be added to the preview or execute bins are provided. By default, text and sounds are placed in the preview bin $59_1$ and all other actions are placed in the execute bin $59_2$. However, the user can reassign the bin of any action.

The preview bin $59_1$ stores action that occur when the user first selects the object. These actions are generally inconsequential in that they keep the user within the same environment. For example, the actions might introduce an object and its primary action. It might be a spoken text, pop-up text, or a recorded sound. The execute bin $59_2$ stores actions that occur when the user selects the same object again. These actions generally taken the user to a new environment or to another application and can therefore be considered consequential.

An object can have more than one action to perform in each bin. The order of execution is from left to right in the bin and the user can rearrange the order in which the actions occur. The following actions are examples of selectable actions:

A spoken text selection will cause the object to speak text entered in the value dialog box 238.

A pop-up text selection will cause the object to display text until the cursor points to another object. The content of a pop-up text is provided in the value dialog box 238.

A spoken and pop-up text selection will cause the object to speak and display the text entered in the value dialog box 238.

A pop-up picture selection will cause the object to display a picture until another object is either pointed to or selected.

A sound selection will cause the object to play a previously recorded sound stored in a file on the hard drive.

A movie selection will cause the object to play a movie file that is stored on the hard drive. The name of the movie file appears in the value dialog box 238.

A link selection will cause the object to switch to another environment, the name of which appears in the value dialog-box 238. A link action always occurs last in any sequence of actions to prevent a premature jump to a new environment.

A launch selection will cause the object to start up another software program that is on the hard drive. The name of the application appears in the value dialog box 238.

A script selection will cause the object to execute a script instruction or a file to containing script commands.

An X-10 selection will cause the object to activate a device or appliance that has been set-up with an X-10 address of an Environmental Control Unit (ECU).

An infrared selection will cause the object to send an infrared signal to remotely control another device, such as a media device or an X-10 ECU. The commands entered by the user appear on the value dialog box 238.

Dialog boxes 239 are also provided to permit the user to change the text font, font size, bolding, centering and color attributes.

Figure 10A:
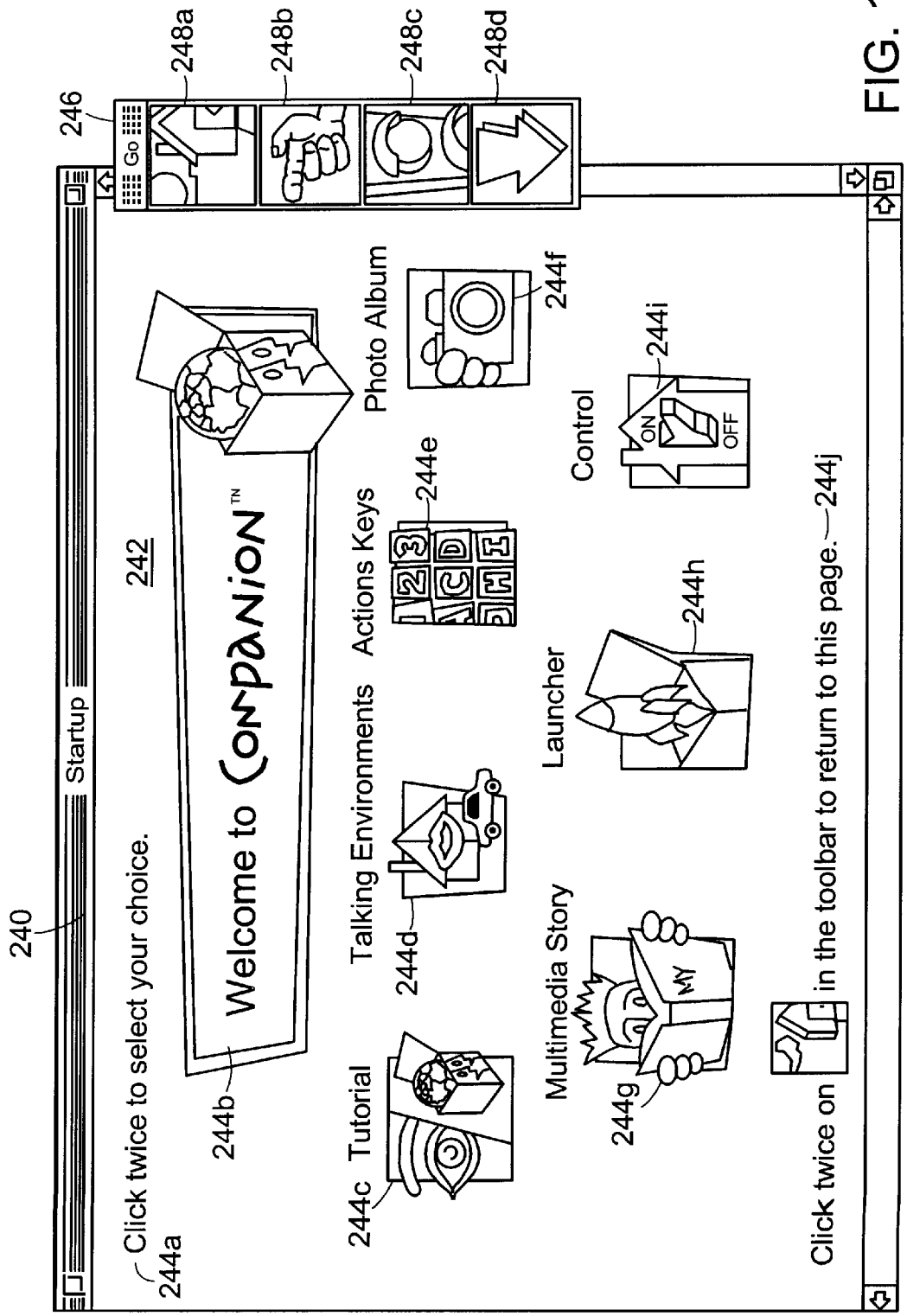
FIGS. 10A–10B are screen views illustrating an example application of the invention.
Figure 10B:
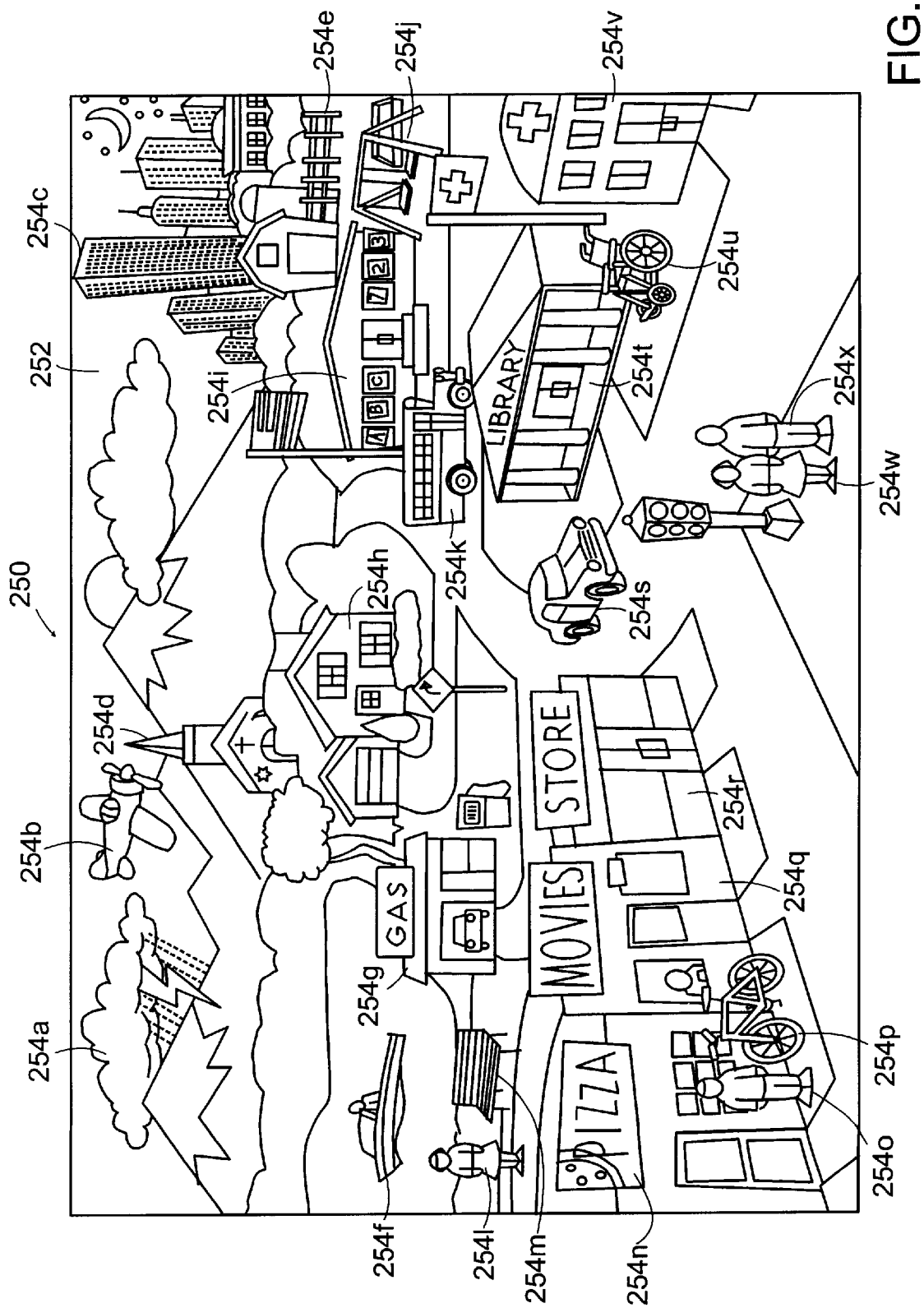

Although the ability to use the software to create and modify environments are important features of the invention, the power and flexibility of the software will become more apparent with a further example of applying this technology. One use of the system is to interface a handicapped or disabled person with the outside world. FIGS. 10A–10C are screen views illustrating an example application of the invention.

FIG. 10A is a screen view of an exemplary start-up environment. The start-up environment includes an environment window 240 having a background 242 and overlaying objects 244a–244j. Also illustrated is a toolbar environment 246 overlaying the environment window 240. As illustrated, every feature overlaying the background is associated with an object. Some objects 244a, 244b, 244j execute simple actions such as providing pop-up text or speaking a description to the user. Other objects 244c–244i execute more sophisticated actions.

A Tutorial object 244c is preferably configured to teach the user to use the AAC software system. By executing the Tutorial object 244c, the user is preferably led to other sub-environment. These sub-environments can teach the user how the AAC software-works and can provide samples of different objects. User can thus learn how to customize an object's appearance and see examples of actions it can perform.

A Talking Environments object 244d is preferably configured to take the user to a communication and activities environment. FIG. 10B is a screen view of an exemplary communication and activities sub-environment reached from the Talking Environment object 244d of FIG. 10A. This sub-environment 250 includes a town scene as a background image 252.

By selecting the various objects 254a–254x in the town scene, the user can hear sounds and speech, see pop-up pictures and link to other environment. For example, a house object 254h takes the user to a virtual home environment with many virtual rooms. A park bench object 254m takes the user to a virtual park scene environment. Restaurant and store objects 254n, 254r take the user to other environments representing the businesses. A schoolhouse object 254i takes the user to a virtual classroom environment. A movie theater object 254q can use a lower level environment to show the user a preview of coming attractions at the real theater.

Focusing on the home object 254h, by executing this object the user is taken to a new sub-environment which is a virtual representation of the rooms in the user's home. There, by executing a particular room object, the user is taken inside the virtual room where more specific task can be accomplished. For example, by selecting a media device, such as a television, the user can control the device, such as selecting a channel and volume. By clicking on a bed, the user can cause a synthesized voice to say "I want to go to bed." Through a virtual closet, the user can select clothes. In a home office environment, the user can select a calendar to launch a calendar application, execute a fax icon to launch a computer fax application or other suitable task. In this way, the user can take command of the outside world by communication with others through the computer or by directly commanding objects to act using the computer.

Returning to FIG. 10A, an Action Keys object 244e is preferably configured to demonstrate to the user how pop-up text and pictures can be incorporated into an application.

A Photo Album object 244f is preferably configured to display a sub-environment which includes a series of digitized photographs. Further details of creating a photo album will be described below with reference to stationary files.

A Multimedia Story object 244g is preferably configured to present the user with a sub-environment which includes a scene using a picture, sound, written text, and spoken text.

A Launcher object 244h is preferably configured to incorporates the environment aspect of the invention as an alternative desktop. That is, by selecting a desktop object, the user is presented with a sub-environment having objects which, when executed, launch another application.

A Control object 244i is preferably configured so the user can control the surroundings using the AAC software system and X-10 technology. For example, if a light is connected to address A1 on the user's X-10 control center unit, it will turn on or off when a lamp object is selected. Likewise, if a radio is connected to address A2, it will turn on or off when a radio object is selected.

Figure 11A:
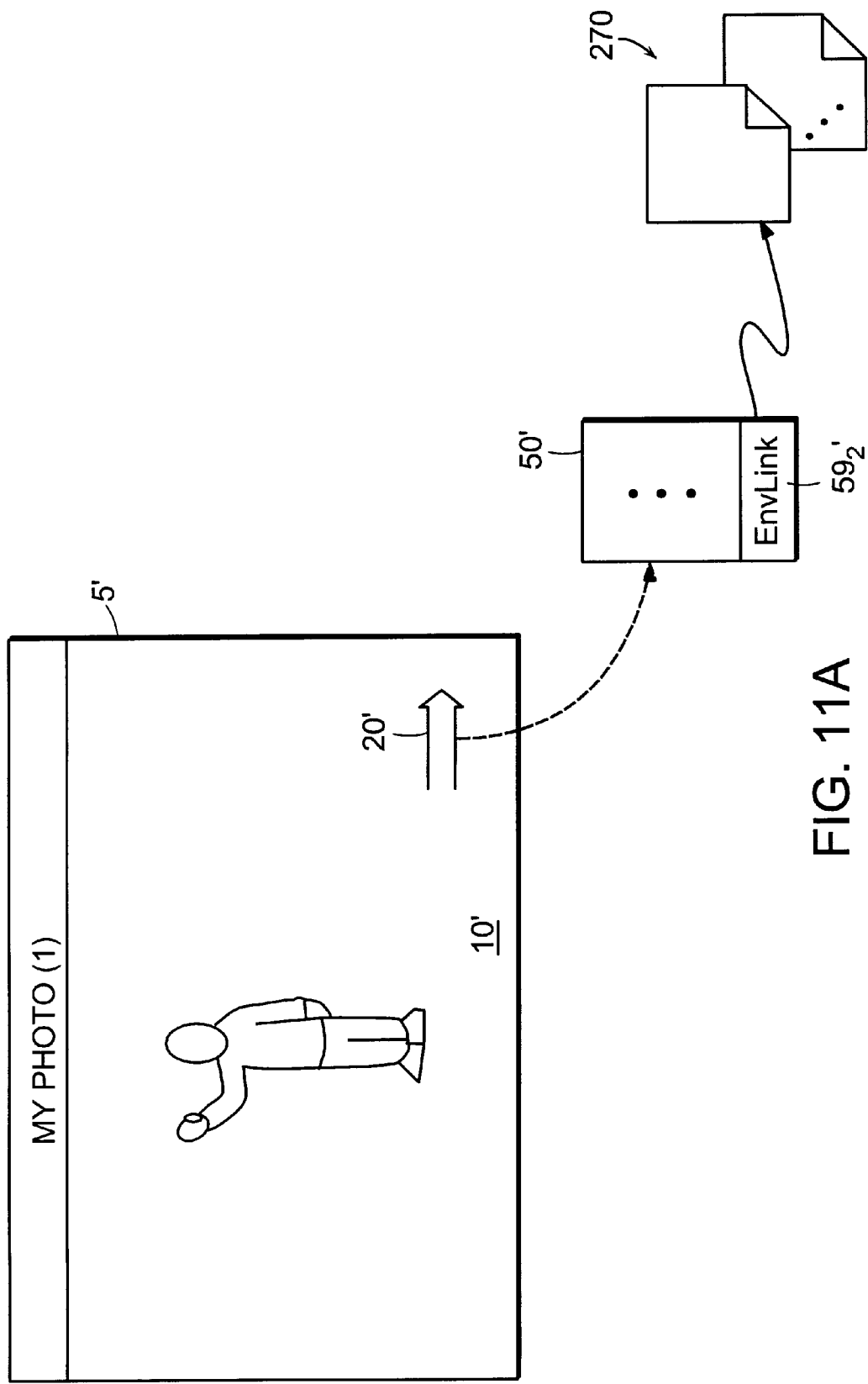
FIGS. 11A–11B are schematic diagrams illustrating the use of stationary files.
Figure 11B:
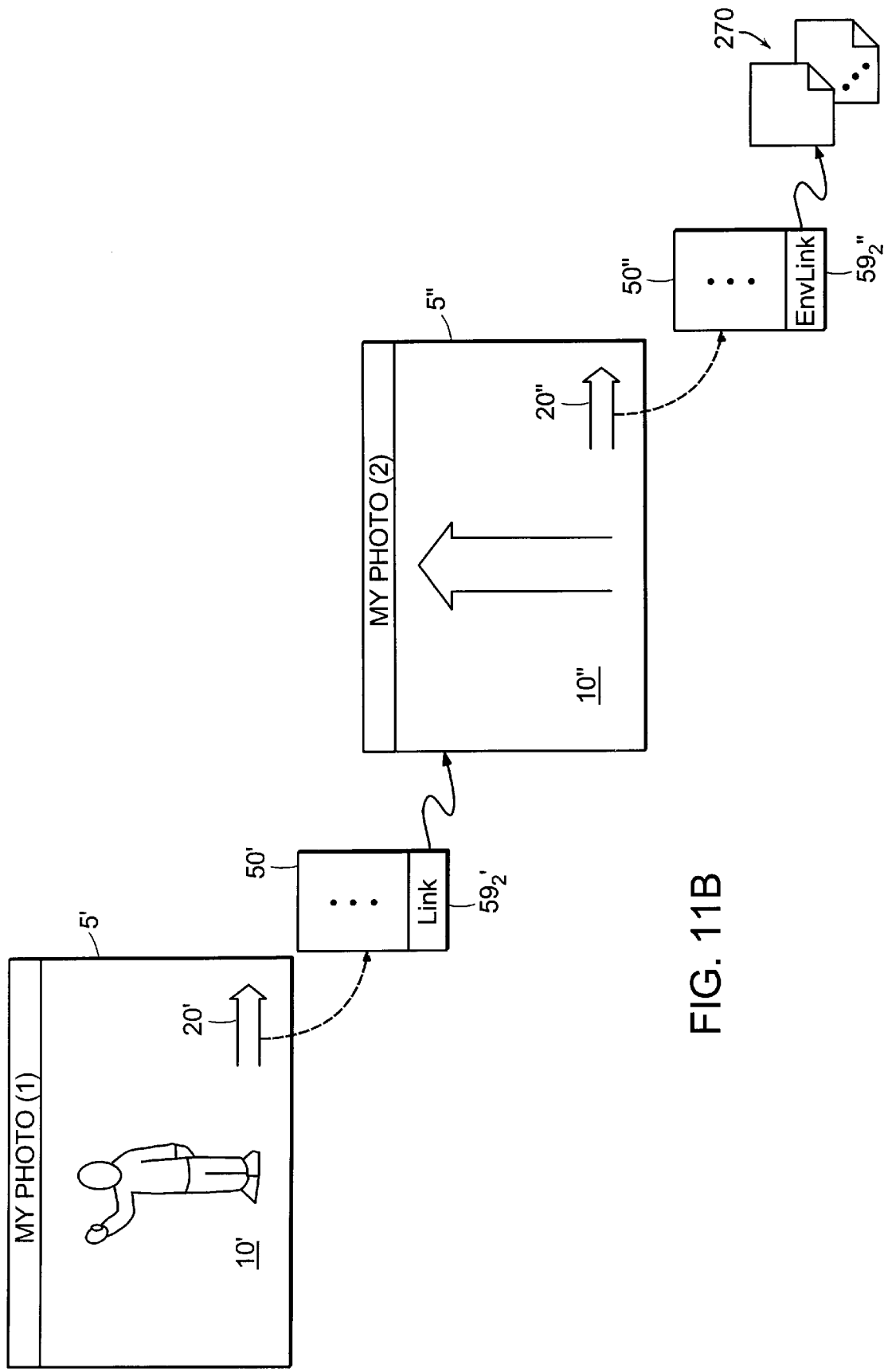

FIGS. 11A–11B are schematic diagrams illustrating the use of stationary files. Stationary files 270 are documents that can be used as a template. Stationary files can be created for any application. One use of stationary files 270 is to provide a file which contains elements that are used frequently or that help build an application that has many screens with a similar design. Such use of stationary files is illustrated by FIGS. 11A and 11B.

As illustrated in FIG. 11A, the environment 5' named My Photos (1) includes a first page having an image and a link object 20'. The link object 20' is defined by an object data structure 50 which has, as an action in the execute bin 59$_2$', an environment link action pointing to the stationary files 270. To create a subsequent page in the photo album, the user executes the link object 20'.

As illustrated in FIG. 11B, the environment link command created a new environment 5". The original link object 20' now includes a link command in the execute bin 59$_2$' which points-to this second page 5" of the photo album. The environment 5" includes a link object 20" which is defined by an object data structure 50" which includes an environment link command in the execute bin 59$_2$" pointing to the stationary files 230.

Returning to FIG. 1, an input device may not provide two separate ways to point to and select objects. With a pointer device, for example, the user may be able to point easily, but not click. With a single switch, the user needs ways to point to an object and to select it. A dwell time is used to select objects with these input methods. In addition, a dwell time can be used with voice or touch commands to reduce the number of user actions needed to select object with merged actions.

A dwell time is a brief period of time that begins when the user points to an object. During a dwell, the pointer shape preferably changes to an animated "counting fingers" cursor, indicating that a dwell is in progress. When the fingers finish counting down, the dwell period ends, or elapses, and the currently highlighted object is automatically selected. Using a dwell period reduces the numbers of gestures needed to select objects.

The user can adjust settings to determine when dwells are used. Pointers, touchscreen, voice, and switch input methods can all be set up to use dwell in some setting combinations. In some cases, two successive dwells signal the preview and the execute actions. In other cases, a dwell is used just for the execute action.

Switch users can point and select by pressing a switch. Pointing is handled through a scanning process, which highlights objects one at a time, either manually or automatically.

During scanning, objects in an environment are highlighted first, in a specific sequence defined by the scan order. Then the toolbar buttons-are highlighted, in order.

The scanning route can also include a "rest stop," which is an inactive area of the background, usually in the upper left corner of the environment. The rest stop gives automatic scan users a way to stop scanning without selecting an object that has an action.

The user can also scan to any other environments that are open, even to environments'that are not visible, e.g., hidden behind other environments. When voice scanning is active, the spoken name of the environment is announced.

A single switch input method combines pressing the switch and using a dwell to select objects. A dual switch input method is an extension of the single switch method.

In accordance with a preferred embodiment of the invention, the user can choose either a step scan or an automatic scan mode. The step scan mode requires the user to activate the switch to step through the objects, which highlights the objects one at a time. To cancel a dwell in progress, the switch is used to step to the next object. To stop scanning without selecting any objects, the user preferably steps to the rest stop.

In the automatic scan mode, each object in the environment is highlighted automatically for a period of time. The user can use a switch to start all the scanning in each new environment. Each object is automatically highlighted, one after another. All the scanning stops when a user selects an object, selects the rest stop, moves the mouse, touches the touchscreen, or traverses a predetermined number of cycles through all objects.

When scanning an environment having many objects, it can be time-consuming and tedious for the user to get to the desired object. To simplify scanning, object can be grouped together. This grouping reduces the number of selections required to scan to a specific object. In accordance with preferred embodiment of the invention, objects in each group are highlighted as one unit during scanning. The group can then be selected, which permits scanning through the individual objects in the group to select a desired object. As described above with regard to FIG. 3, each object in the environment has a scan order position distinct from the draw order position.

Figure 12:
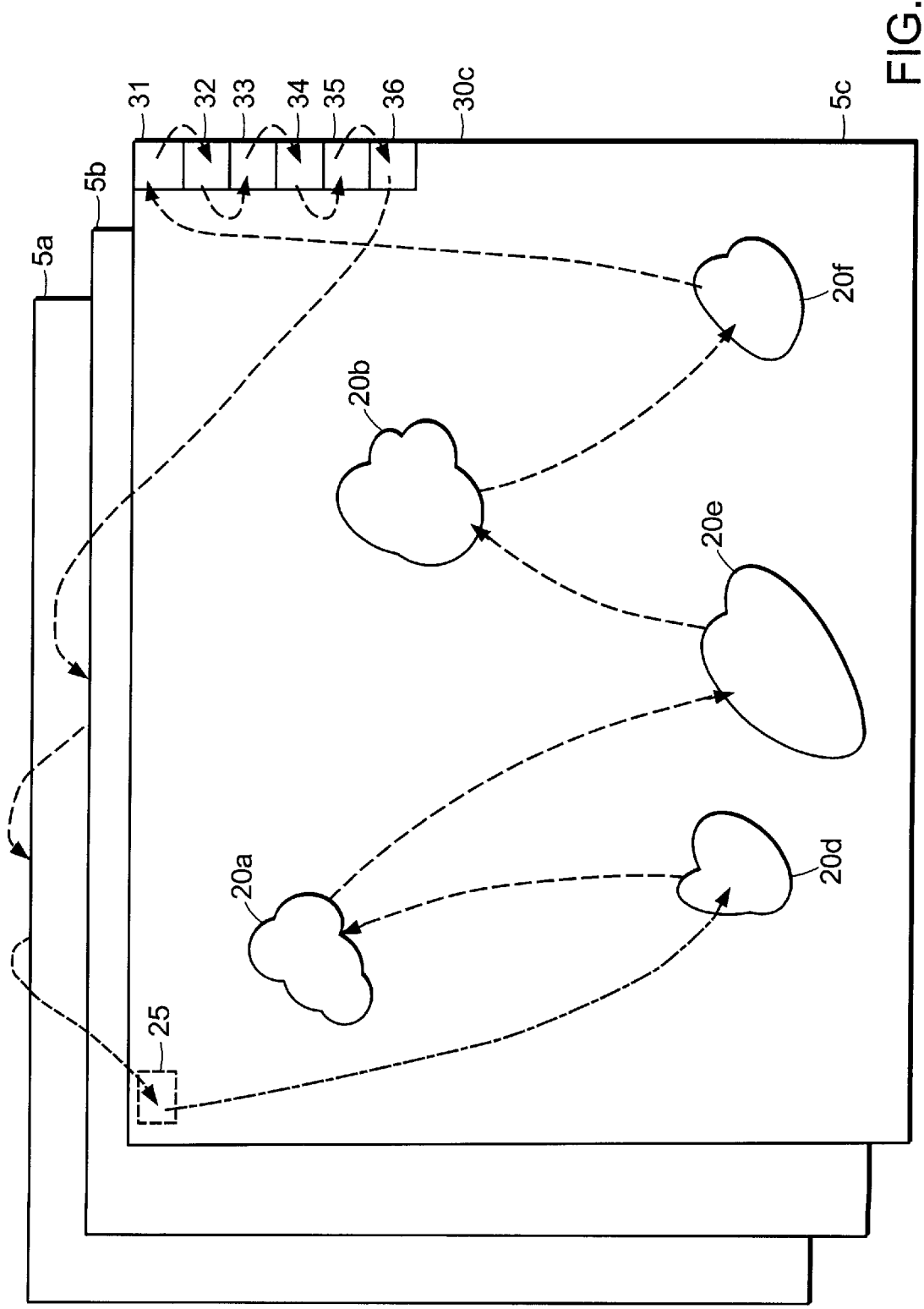
FIG. 12 is a schematic diagram illustrating object scanning.

FIG. 12 is a schematic diagram illustrating object scanning. As illustrated, there are three open environments 5a, 5b, 5c, with the front environment 5c having a plurality of objects 20a–20f. The scan order of the objects is as follows: 20d–20a–20e–20b–20f. In addition, there is a toolbar environment 30c which includes toolbar objects 31, 32, 33, 34, 35, 36. A rest stop 25, which is an inactive area on the screen, is the last item scanned to before the scan cycle repeats.

As illustrated, the scan order is as follows. First, each object 20a–20f is scanned sequentially in its predetermined scan order. Then scanning proceeds to the toolbar 30c where each tool bar objects are sequentially scanned. Next, scanning proceeds to the next lower environment 5b and then to the lowest environment 5a. Once the lowest environment 5a is reached, scanning returns to the rest stop 25 on the front environment 5c. Scanning would then cycle to the first scan object 20d.

Figure 13A:
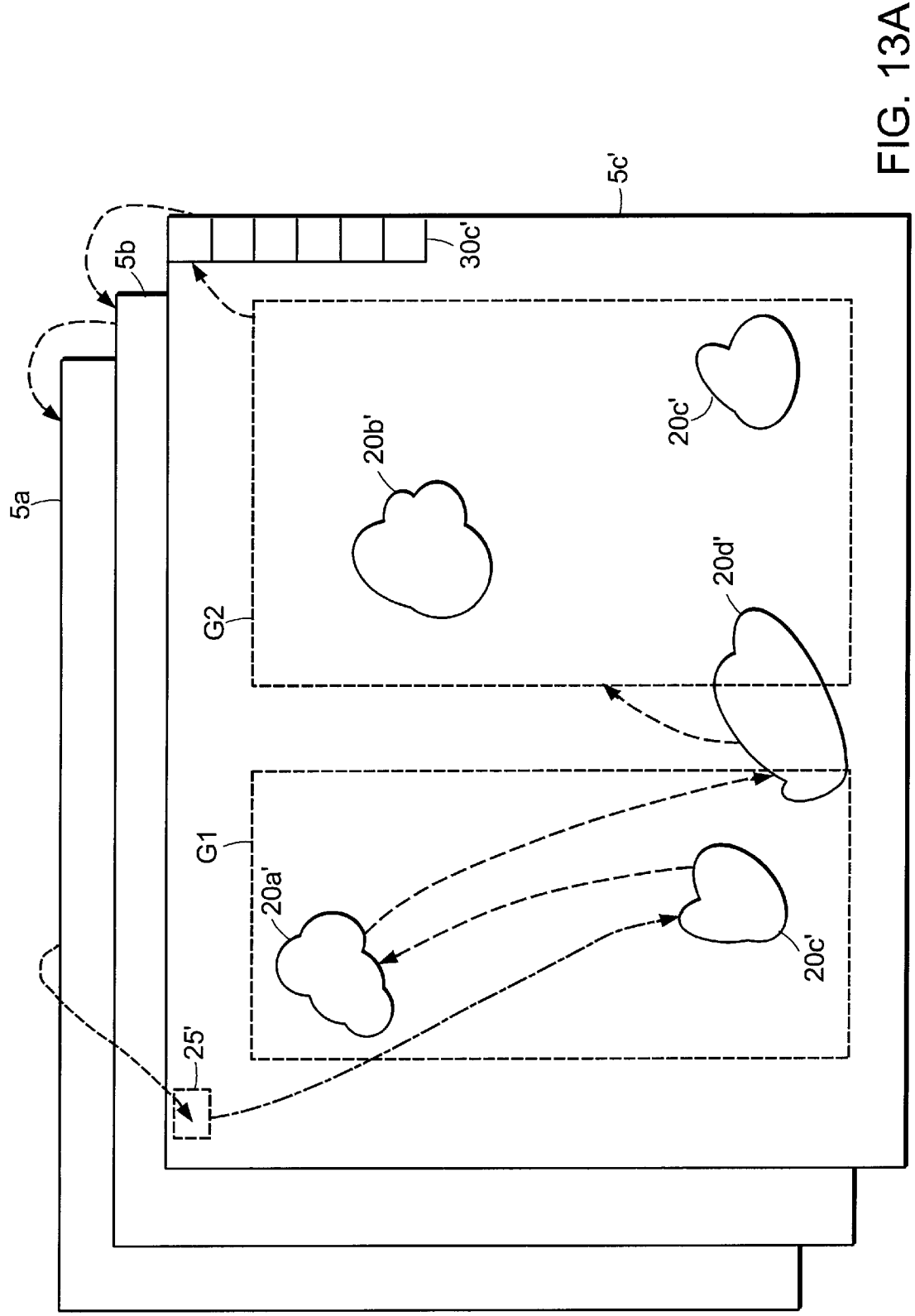
FIGS. 13A–13B are schematic diagrams illustrating group mode scanning.
Figure 13B:
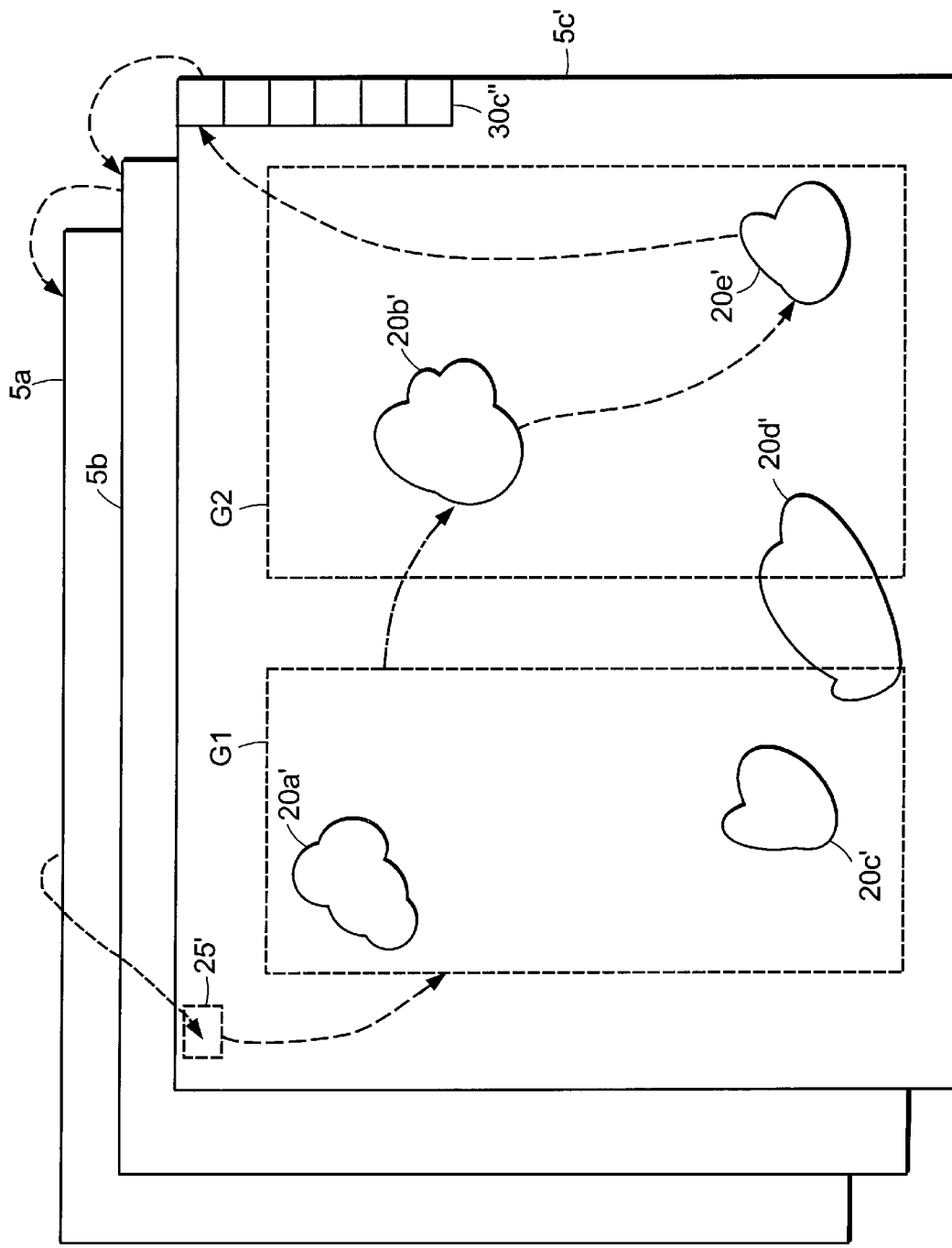

FIGS. 13A–13B are schematic diagrams illustrating group mode scanning. Groups can be defined as being rectangular in shape or as having-arbitrary shapes. For simplicity and ease of description, the groups are illustrated as having rectangular shapes. Preferably, the first group shape (e.g., from left-to-right, top-to-bottom) to touch or enclose an object takes sole possession of that object. An environment can include both subgroups of objects and individual objects.

As illustrated in FIG. 13A, there are a plurality of objects 20a'–20c' within the front environment 5c'. The objects are divided into two groups G1, G2. Group G1 includes objects 20a', 20c', 20d' and group G2 includes objects 20b', 20e'. In group mode scanning, all objects within the currently selected group are scanned while all other groups are scanned.

As illustrated, group G1 is the currently selected group. Therefore, scanning begins with object 20c', continuing to object 20a' and then to object 20d'. After object 20d', scanning continues to group G2, the tool bar 30c', the next environment 5b to the last environment 5a. After the application is scanned to the bottom environment 5a, scanning returns to the rest stop object 25' of the front environment 5c'.

As illustrated in FIG. 13B, group G2 is the currently selected group. As such, scanning begins with object 20b' and then to object 20e'. From object 20e', scanning goes to the toolbar 30c', to the next layer window 5b and then to the lowest environment 5a. From the lowest environment 5a, scanning continues to the rest stop 25 to the first group for G1 and then the cycle begins again with object 20b'.

As mentioned above, the user can control the computer using a variety of input methods. The user can select a primary input method, for example, a mouse, keyboard, touchscreen, switch or an alternative pointer, or voice input. By specifying a primary input method, the environments can be particularly configured for that selected input device.

The user selects a mouse input device if the user uses a standard mouse or equivalent, such as a track pad or track ball with a button. Generally, the object is announced when the cursor is over the object on the display screen. The objects actions occur when the user presses down on the mouse button. The user can, however, alter this general approach. The user can select a "click once" mode wherein the announce and preview bin actions are executed when the cursor moves over an object. A single click of the mouse button executes the object. Alternatively, the user can select a "click twice" mode wherein the object is announced when the mouse cursor moves over it. A single click of the mouse button on the highlighted-object executes the preview bin actions and a second click executes the execute bin actions.

Generally, pressing tab on the keyboard points to each object, in turn, and announces it. The user can select a "one return" mode where a single press of the tab key announces and previews an object, and a press of the return key executes the highlighted object. In a "two returns" mode, a single press of the tab key highlights an object, a press of the return key once previews the highlighted object, and a second press of the return key executes the object.

Touch actions occur when the user releases from the touchscreen. This allows the user to slide the touching finger away from the selected object to cancel his action. User can select a "touch once" mode to instruct the application that a single touch of an object causes it to be announced, previewed, and executed. In a "touch twice" mode, the user touches an object once to announce and preview it, and a second time to execute it.

Switch input users use scanning to select objects, as described above. The user can select between step scan and "automatic scan" mode for a single or dual switch setup. In the step scan mode, the user highlights objects one at a time using a switch. In automatic scan mode, the user uses a switch to begin automatic scanning, where each object, in turn, announces itself.

Using an alternative pointer input, the pointer highlights an object, a dwell period begins and an animated "counting fingers" cursor shows the progress of the dwell. When the dwell period is over, the objects preview occurs. When the preview ends, a second dwell begins. When the second dwell is over, the object performs its execute action. To execute the object again, the user simply moves the pointer away from the object and back to it.

The user can also give voice commands by speaking object names and the keyword "execute." The user can select a name mode where the user speaks an object's name to announce and then preview it. The execute actions begin after a dwell period. By speaking the name of another object or saying "stop" or "cancel", the countdown for the dwell period is canceled. By selecting a "name and execute" mode, the user can speak an object's name to announce and then preview it. By saying the word "execute" the objects starts its execute actions.

As a visual cue to the user, object borders are highlighted in different colors depending on the state of the system. In normal mode, a first color (e.g., red) is used to highlight the border of an object that will preview if selected by the user. A second color (e.g., blue) is used to highlight the border of an object which will execute if selected. The last object executed will appear in a color which is a mix of the first and second colors (e.g., purple). A similar scheme is used in edit mode except that different colors are used (e.g., yellow for preview, green for execute, bright green for last executed). By displaying this color scheme, a user can keep track of what objects have recently been used.

These input methods are seamlessly integrated into the system so that all functions are accessible to all users. It should be noted that the touchscreen input method is always available to any user when the AAC software executes on a computer having a touchscreen. Indeed, a user or users can alternate between different input methods without adversely affecting the operation of the system. Specifically, any input event may originate from any input device to create a command or input character. The AAC software received events from a global event queue (discussed in further detail below). The events are handled by event processor functions. FIGS. 14–21 illustrate the event processor functions of the system.

Figure 14A:
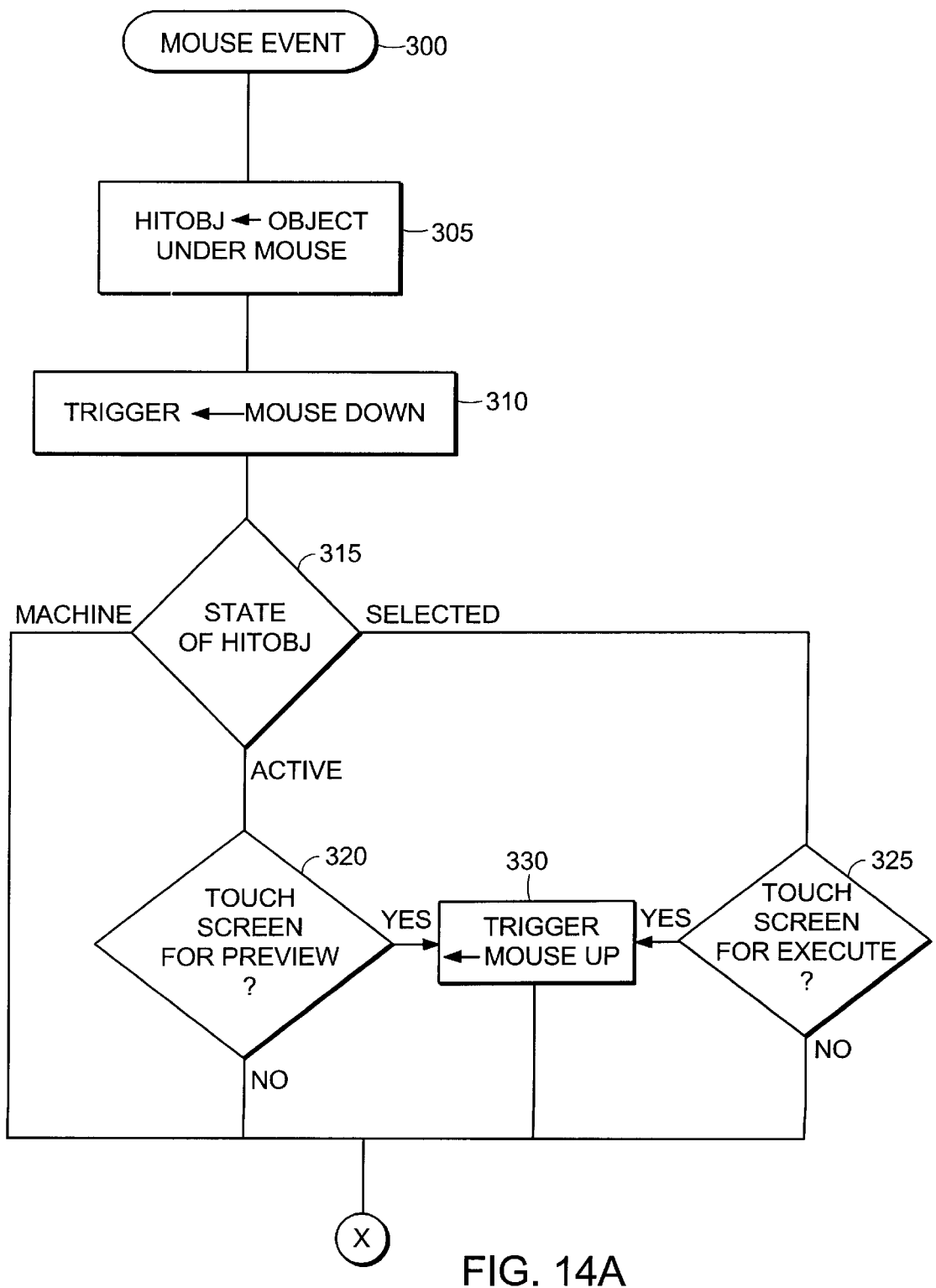
FIGS. 14A–14B are flowcharts of a mouse event function.
Figure 14B:
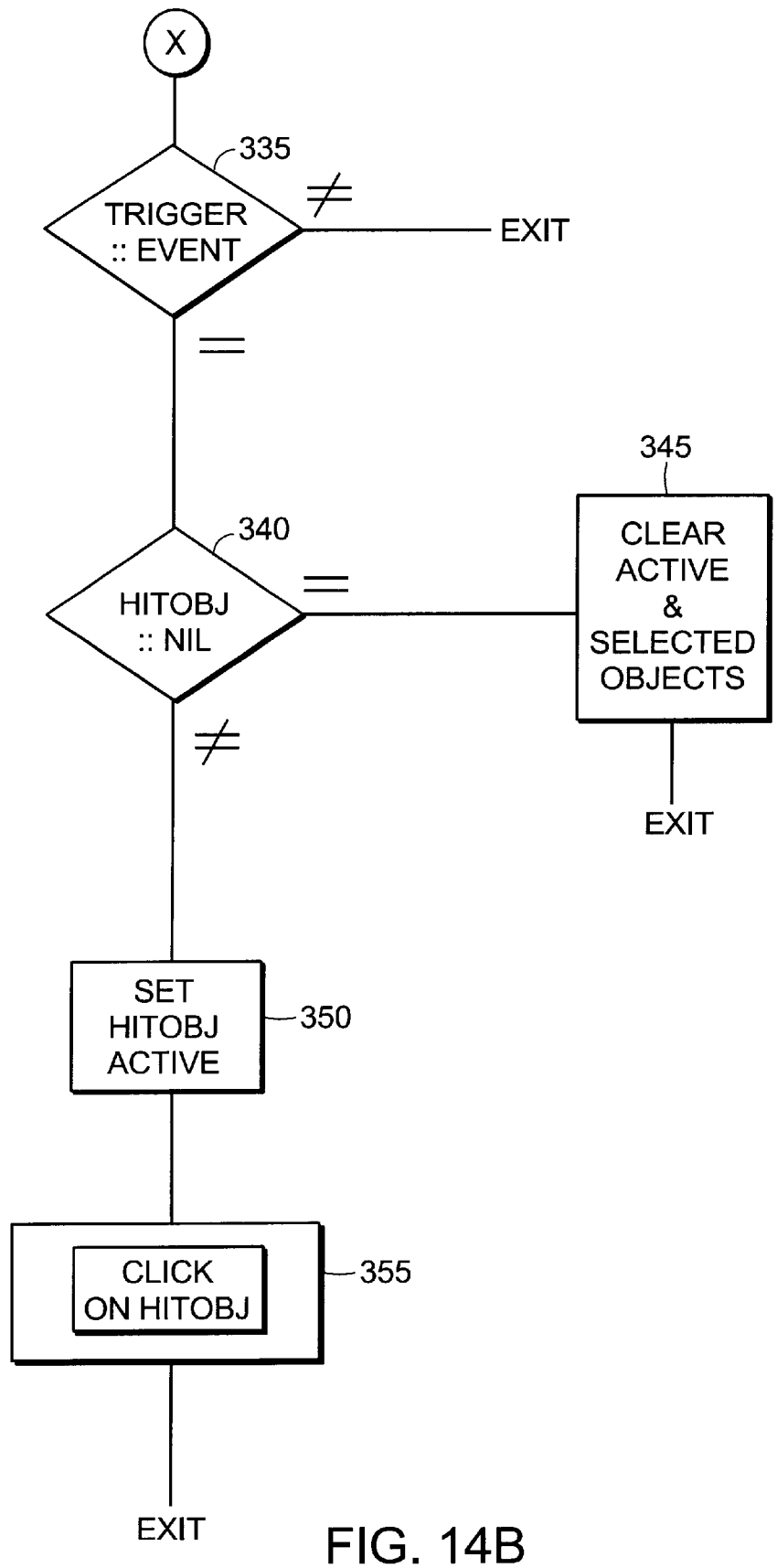

FIGS. 14A–14B are a flowchart of a mouse event function. Table 1 below lists the distinctions between a mouse and a touchscreen event. The mouse event function 300 implements these relationships:

TABLE I

|  | Mouse | Touchscreen |
| --- | --- | --- |
| move cursor | announce | announce |
| mouse down (1) | preview | announce |
| mouse MP (1) | — | preview |
| mouse down (2) | execute | — |
| mouse up (2) | — | execute |

Upon entering the mouse event function 300, processing continues to step 305 where the global variable HitObj 69 is set to point to the object under the mouse cursor. At step 310, the trigger flag 70 is set to the mouse down action.

At step 315, the state of the hit object from the Flags field 52 of the target object is checked. If the object is inactive, processing exits. If the object is active, processing controls to step 320 and the touchscreen is checked for previewing the object. If not true processing exits; otherwise processing continues to step 330. Returning to step 315, if the object is selected, processing continues to step 325 where the touchscreen is checked for an execute action. If not true, processing exits; otherwise processing continues to step 330.

At step 330, the trigger flag 70 is set to the mouse up state. Processing then continues to step 335 where the trigger is compared with the event from the event queue. If they are not the same, processing exits; otherwise processing continues to step 340.

At step 340, the hit object pointer 69 is compared against nil. If the-hit object pointer is nil, then processing continues to step 345 where the active and selected objects are cleared, and processing then exits. If the hit object is not nil, processing continues to step 350 where the hit object is set to active. At step 355 a function is called passing the hit object pointer. Processing then exits.

Figure 15:
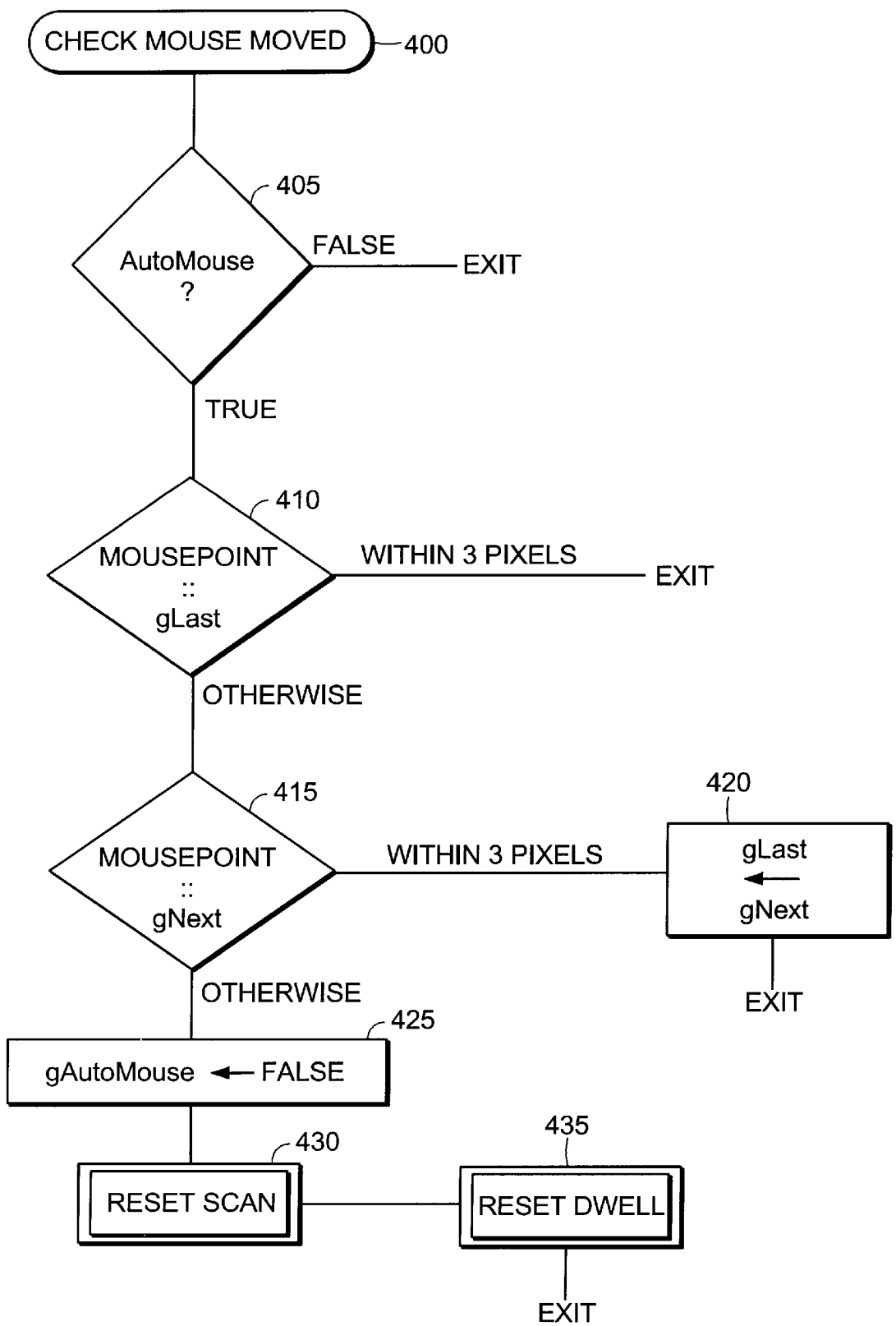
FIG. 15 is a flowchart of a check mouse movement event function.

FIG. 15 is a flowchart of a check mouse movement event function. The function 400 begins at step 405 where the AutoMouse flag 64 is checked to determine if the mouse has been moved automatically, such as in auto scan mode. If the AutoMouse flag 64 is false, then processing exits. If the AutoMouse flag 64 is true, processing continues to step 410.

At step 410, the current mouse point (MousePt) 84 is compared with the last mouse point (Last) 72. If the two compare, within preferably three pixels, then it is assumed that the mouse movement is the result of a bump of the mouse and processing exits. If the current mouse point 84 and last mouse point 72 differ, preferably by more than three pixels, processing continues to step 415.

At step 415, the current mouse point (MousePt) 84 is compared against the next mouse point (Next) 71, which is the target destination of the mouse cursor. If the two mouse points are within preferably three pixels, the mouse has reached its destination and processing continues to step 420, when the last mouse point 72 is set to the next mouse point 71 and processing exits. If the mouse points differ by more than the allotted three pixels, then the mouse has moved and processing continues to step 425.

At step 425, the AutoMouse flag 64 is set to false and processing continues to step 430. At step 430, a ResetScan functions is called to turn off auto and group scanning. Upon return, at step 435, a ResetDwell function is called to reset the dwell counter to zero. Upon return, processing then exits.

FIGS. 16A–16G are a flowchart for a null event function. A null event includes, for a touchscreen, a mouse down event. Returning to FIG. 16A, at step 505, the check mouse movement function 400 (FIG. 15) is called. At step 510, the AutoMouse flag 64 is checked, the current mouse point 84 is compared with the last mouse point 72, and the last mouse point 72 is compared with the next mouse point 74. If the AutoMouse flag 64 is set, and the current mouse point 84 is equal to the last mouse point 72, and the last mouse point 72 is not equal to the next mouse point 74, then processing exits. However, the mouse is temporarily ignored from the time a movement is requested until the mouse has actually moved (i.e., a transition state). Otherwise, processing continues to step 515.

At step 515, the current mouse point 84 is checked to see if it is inside the window by a system call. If the mouse is outside the window, a DwellBackground function is called at step 520 to do cleanup of the prior mode. Upon return, processing exits. If the mouse is in the window, processing continues to step 525 to determine what the mouse is pointing at.

Figure 16A:
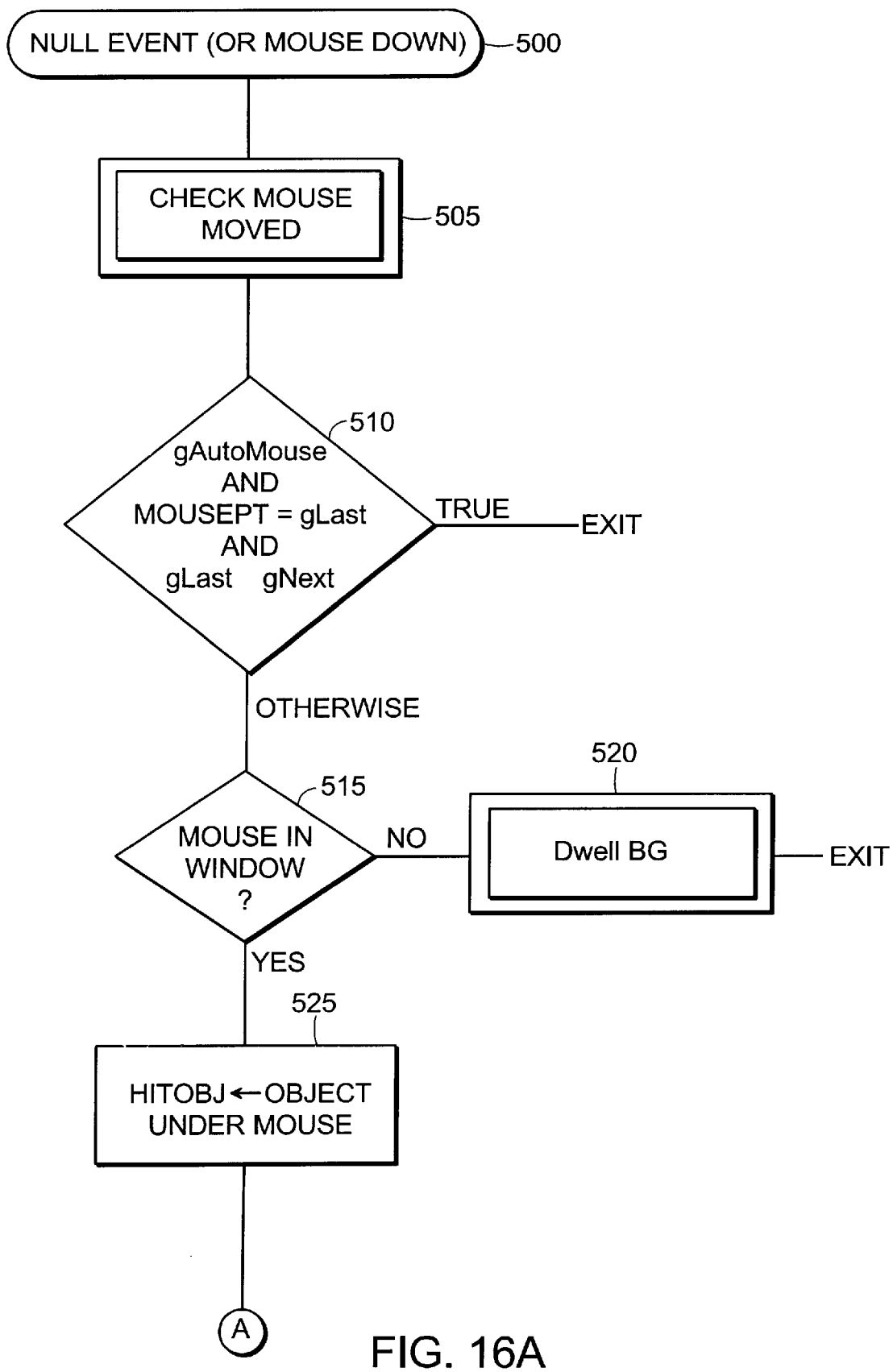
FIGS. 16A–16G are a flowchart for a null event function.
Figure 16B:
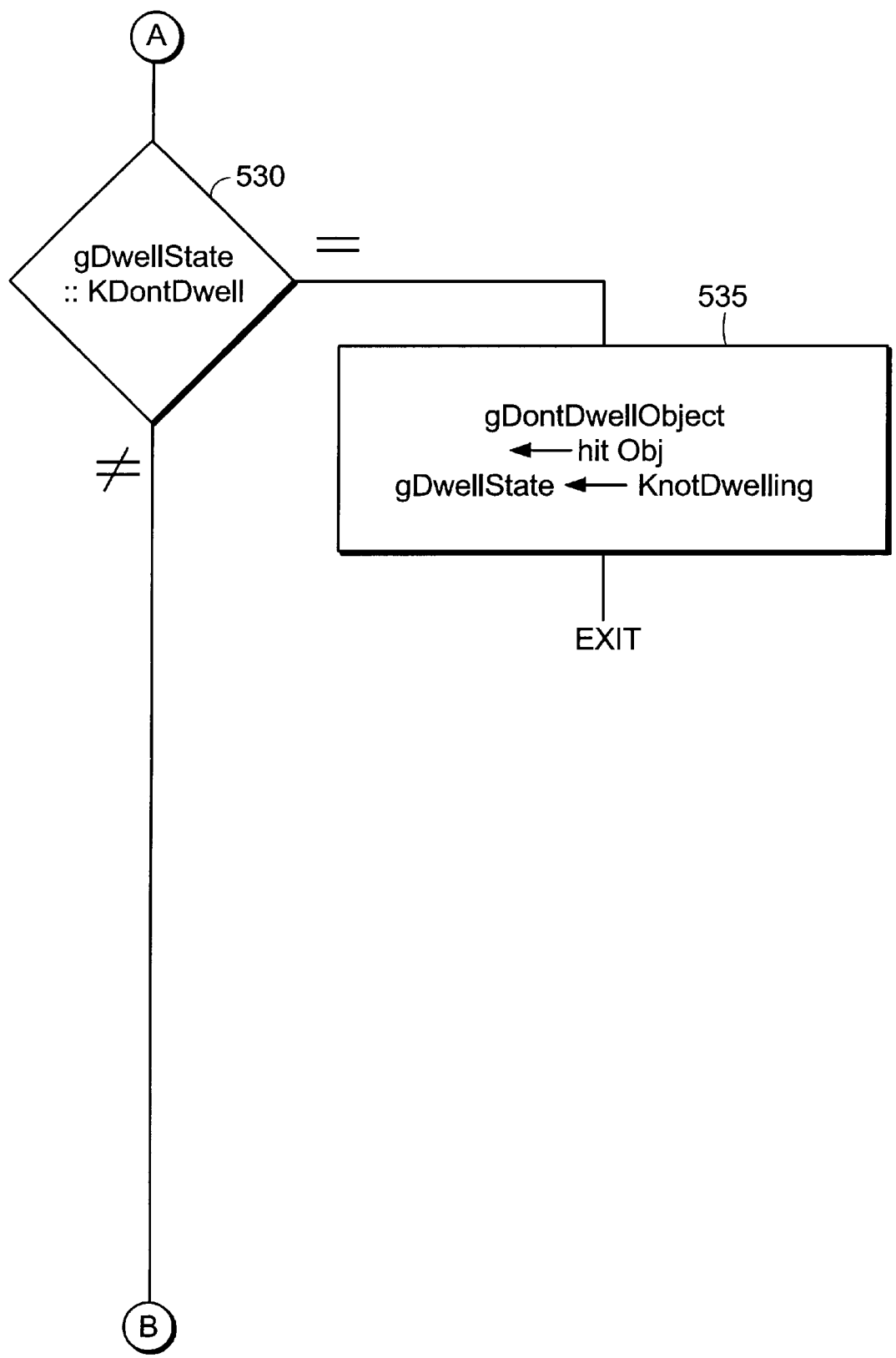

At step 525, the HitObj pointer field 69 is set to point to the object under the mouse cursor and processing continues to step 530 (FIG. 16B).

Figure 16C:
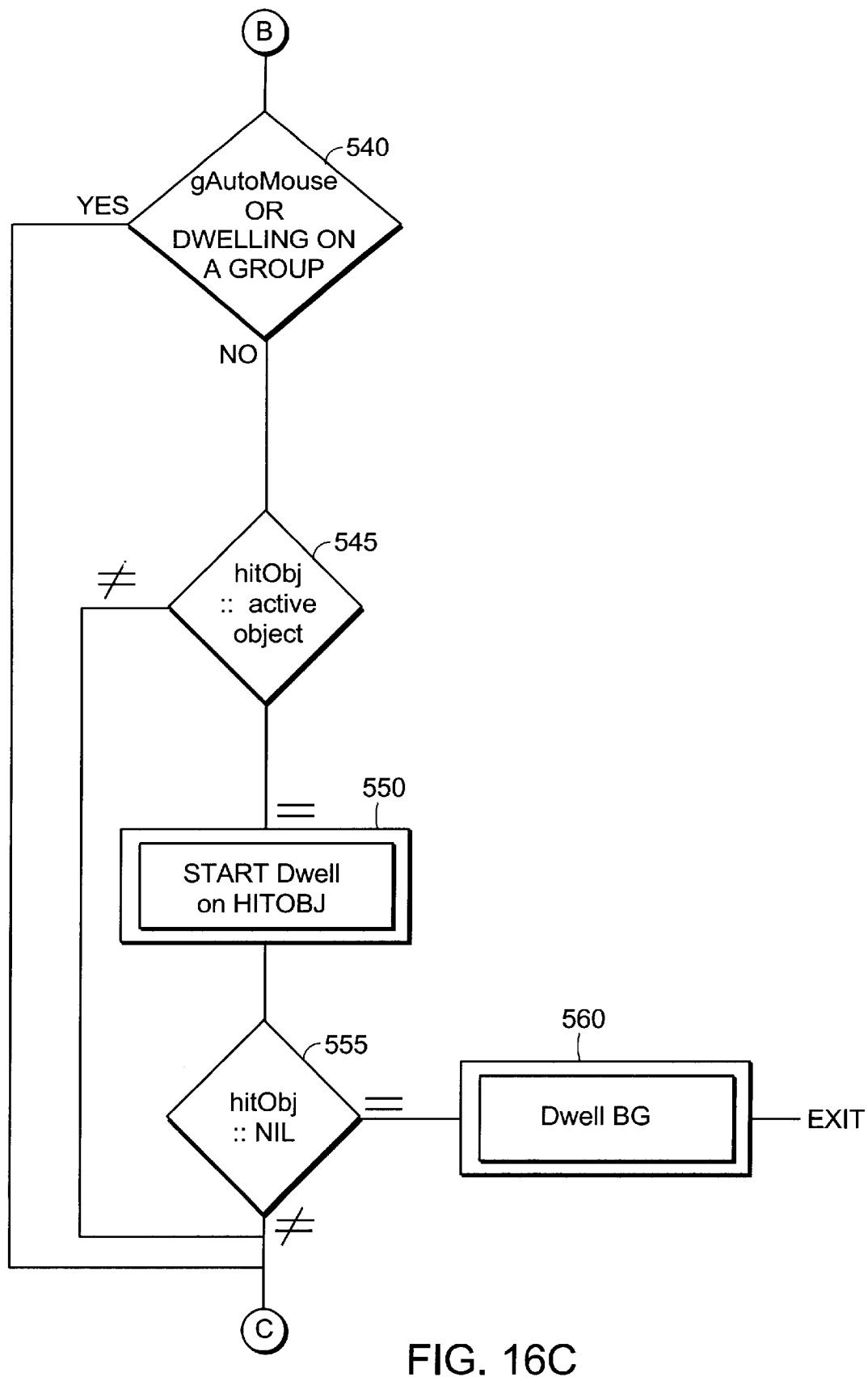

Returning to FIG. 16B at step 530, the DwellState flag 63 is compared with the do-not-dwell constant. If the DwellState is equal to the do-not-dwell constant, the user has switched environments, and processing continues to step 535 where the DontDwellObject field 62 is set equal to the HitObj field 69 and the DwellState 63 is set equal to not-dwelling to avoid triggering an object at the point when switching environments, and processing exits. If the dwell state is not equal to the do-not-dwell constant, then processing continues to step 540 (FIG. 16C).

Figure 16D:
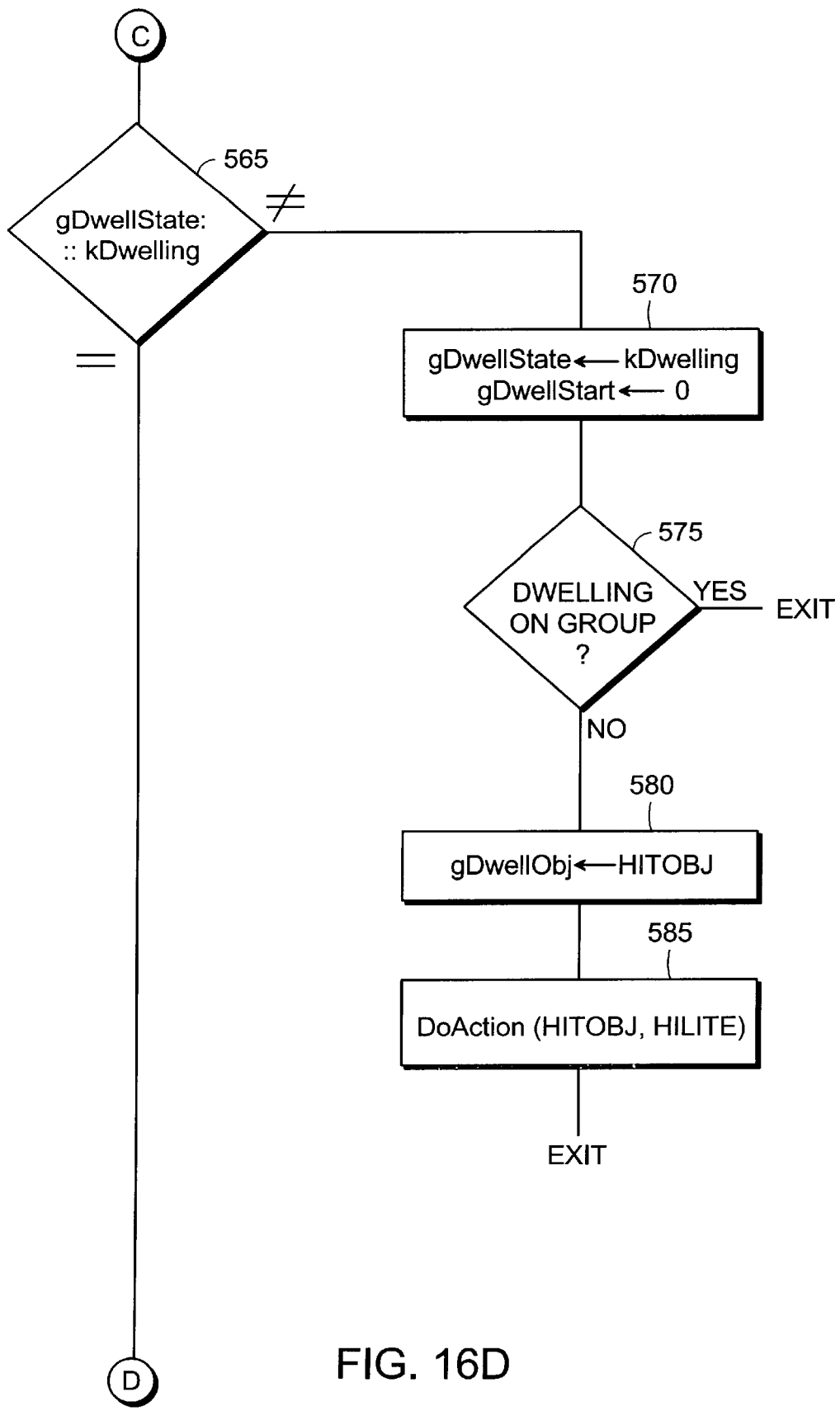

Returning now to FIG. 16C, at step 540, the AutoMouse flag 64 is checked and a determination is made whether the system is dwelling on a group. If either condition is satisfied, processing jumps to step 565 (FIG. 16D). Otherwise processing continues to step 545.

At step 545, the HitObj pointer 69 is compared with the active object. If they are not the same, then processing jumps to step 565 (FIG. 16D). If the two objects are the same, then a StartDwell function is called passing HitObj at step 550 to start the dwell countdown on the current object. Upon return, processing continues to step 555.

At step 555, the HitObj pointer 69 is compared against nil. If the HitObj pointer is not nil, processing then continues to step 565 (FIG. 16D). If the HitObject pointer is nil, then processing continues to step 560, where the DwellBackground function is called and, upon return, processing exits.

Figure 16E:
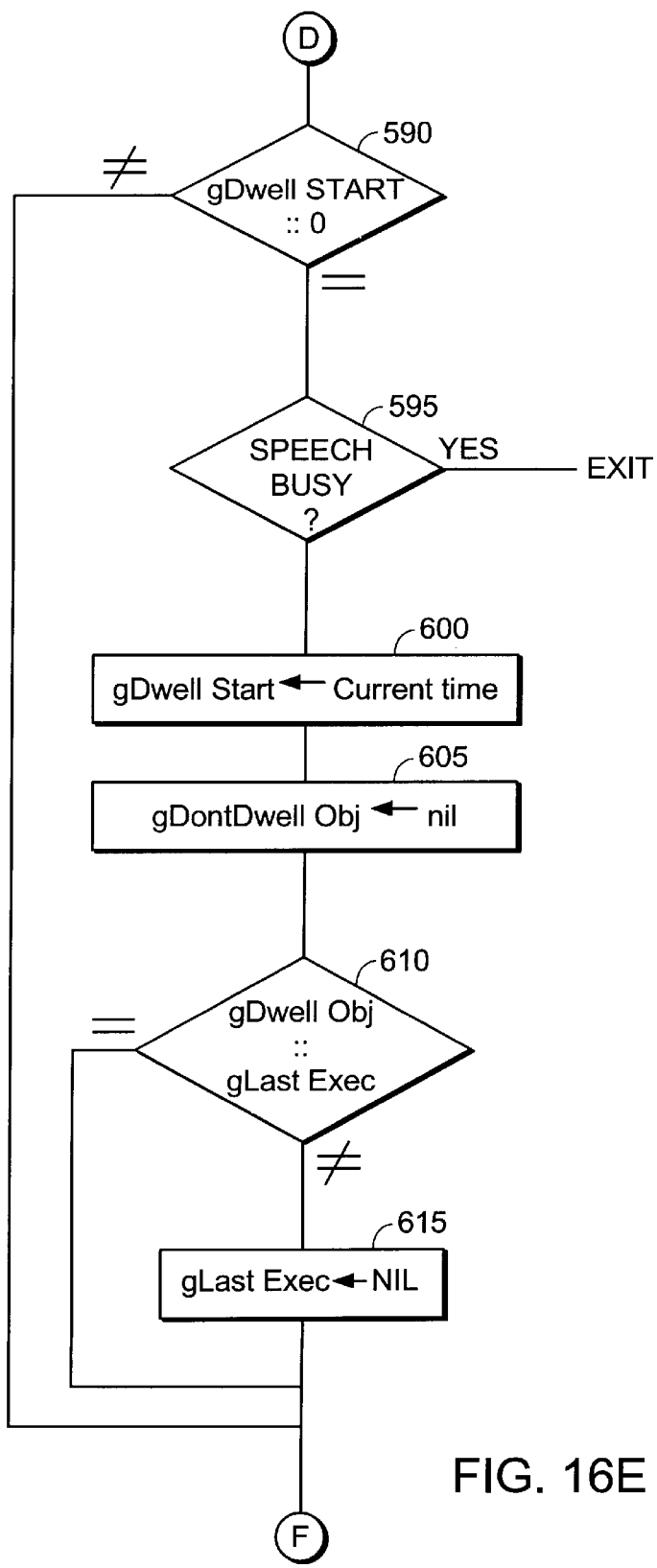

Referring to FIG. 16D, at step 565, the DwellState field 63 is compared against a dwelling constant. If the dwell state indicates dwelling, then processing jumps to step 590 (FIG. 16E). If the DwellState does not indicate dwelling, then processing continues to step 570, where the DwellState field 63 is set to the dwelling constant and the DwellStart time field 66 is initialized to zero. Processing continues to step 575, where a check is made to determine whether the system dwelling on a group. If so, processing exits. Otherwise processing continues to step 580.

At step 580, the DwellObj field is set to point to the hit object. Then processing continues to step 585 where a DoAction function is called, passing the hit object pointer and a highlight command, to perform a bin task. Processing then exits.

Figure 16F:
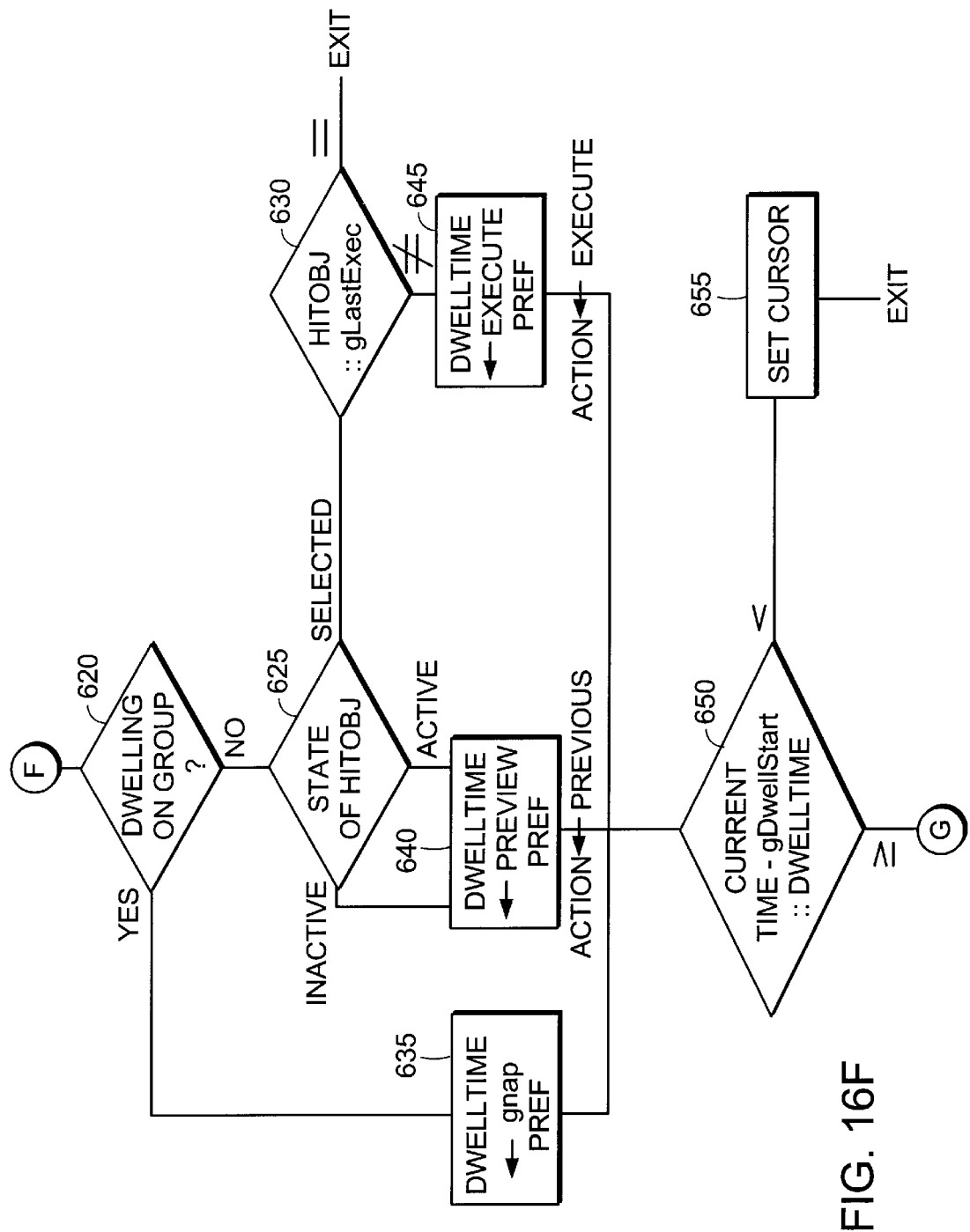

Referring to FIG. 16E, at step 590, the DwellStart time field 66 is compared with the initial value of zero. If a dwell is already in progress, as indicated by a number zero value, processing jumps to step 620 (FIG. 16F). If the dwell has just been initialized, processing continues to step 595.

At step 595, a determination is made whether speech processing is busy. If so, the processing exits because an object voice action (announce, preview, or execute) is still in progress. Otherwise, processing continues to step 600.

At step 600, the DwellStart time field 66 is set to the current time. At step 605, the DontDwellObj field 62 is set to nil. At step 610, the DwellObj pointer is compared with the last executed object (LastExec) pointer 73 to prevent dwelling a third time to cause an execute. If they are equal, then processing jumps to step 620 (FIG. 16F). If they are not equal, then processing continues to step 615 where the LastExec pointer is set equal to nil. Processing then continues to step 620 (FIG. 16F).

Referring now to FIG. 16F, at step 620, a check is made to determine whether the system is dwelling on a group. If not, processing continues to step 625. If true, processing continues to step 635.

At step 625, a determination is made of the state of the hit object. If the hit object is a "selected" object, then processing continues to step 630. Otherwise (i.e., the hit object is "active" or "inactive") processing continues to step 640.

At step 630, the hit-object is compared with the last executed object. If they are the same, then processing exits. Otherwise processing continues to step 645.

Step 635, 640 and 645 set a dwell time field to either a group preference, a preview preference, or an execute preference value, respectively. In addition, steps 640 and 645 set the action to preview or execute, respectively. In all cases, processing then continues to step 650.

At step 650, the DwellStart time field 63 is subtracted from the current time and compared with the dwell time. If dwelling has continued for less than the dwell time, processing continues to step 655 where the "counting fingers" cursor is set and processing exits. If the dwell time has been reached or exceeded, processing continues to step 660 (FIG. 16G).

Figure 16G:
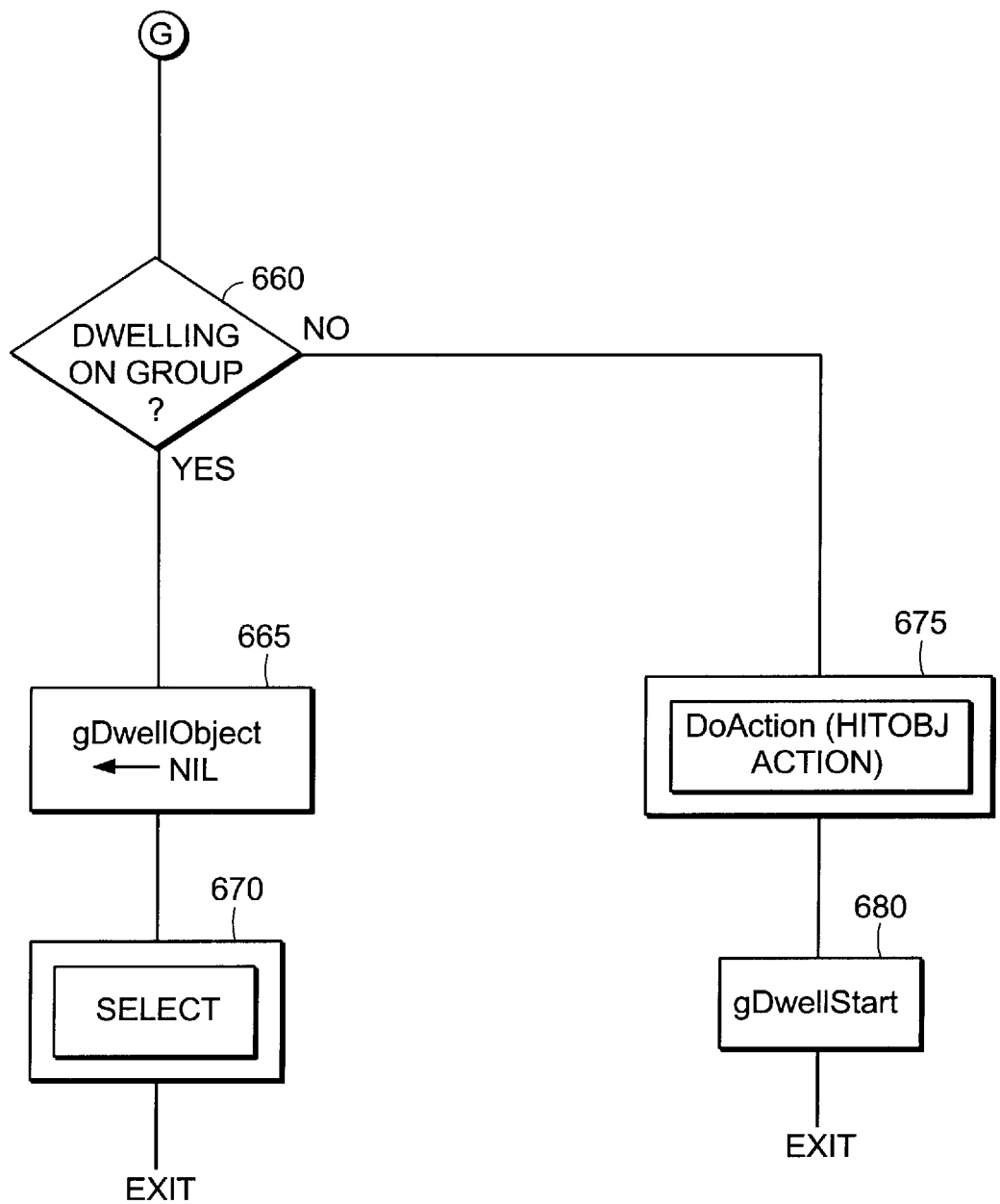

Referring finally to FIG. 16G, at step 660, a check is made to determine whether there is dwelling on a group. If so, processing continues to step 665 where the DwellObj pointer 61 is set to nil and then to step 670 where a Select function is called to decide what is being selected and, based on that decision, to preview or execute the object, switch windows, or enter a group. If there is no dwelling on a group at step 660, processing then continues to step 675 where the DoAction function is called, passing the hit object and the action. Upon return, processing then continues to step 680 where the DwellStart time field 66 is initialized to zero. In either case, processing exits after step 670 or 680.

Figure 17:
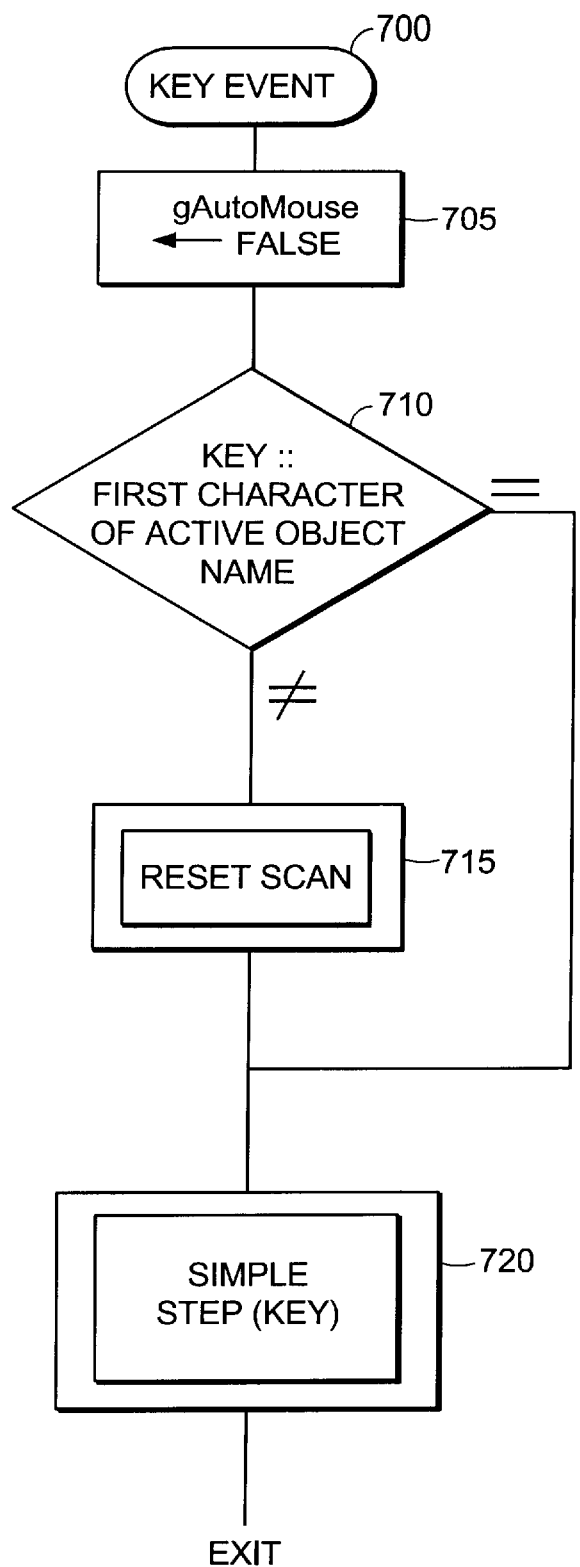
FIG. 17 is a flowchart of a key event function.

FIG. 17 is a flowchart of a key event function. The key event function 700 begins at step 705, where the AutoMouse flag 64 is set to false. Processing then continues to step 710.

At step 710, the value of the depressed key is compared with the first character of the active object name. If they are the same, then processing jumps to step 720. If they are not the same, then the ResetScan function is called at step 715 and, upon return, processing then continues to step 720.

At step 720, a SimpleStep function is called to step from object to object, passing the key value, to step to the next scan feature (e.g., group or object). Upon return the key event function 700 exits.

Figure 18:
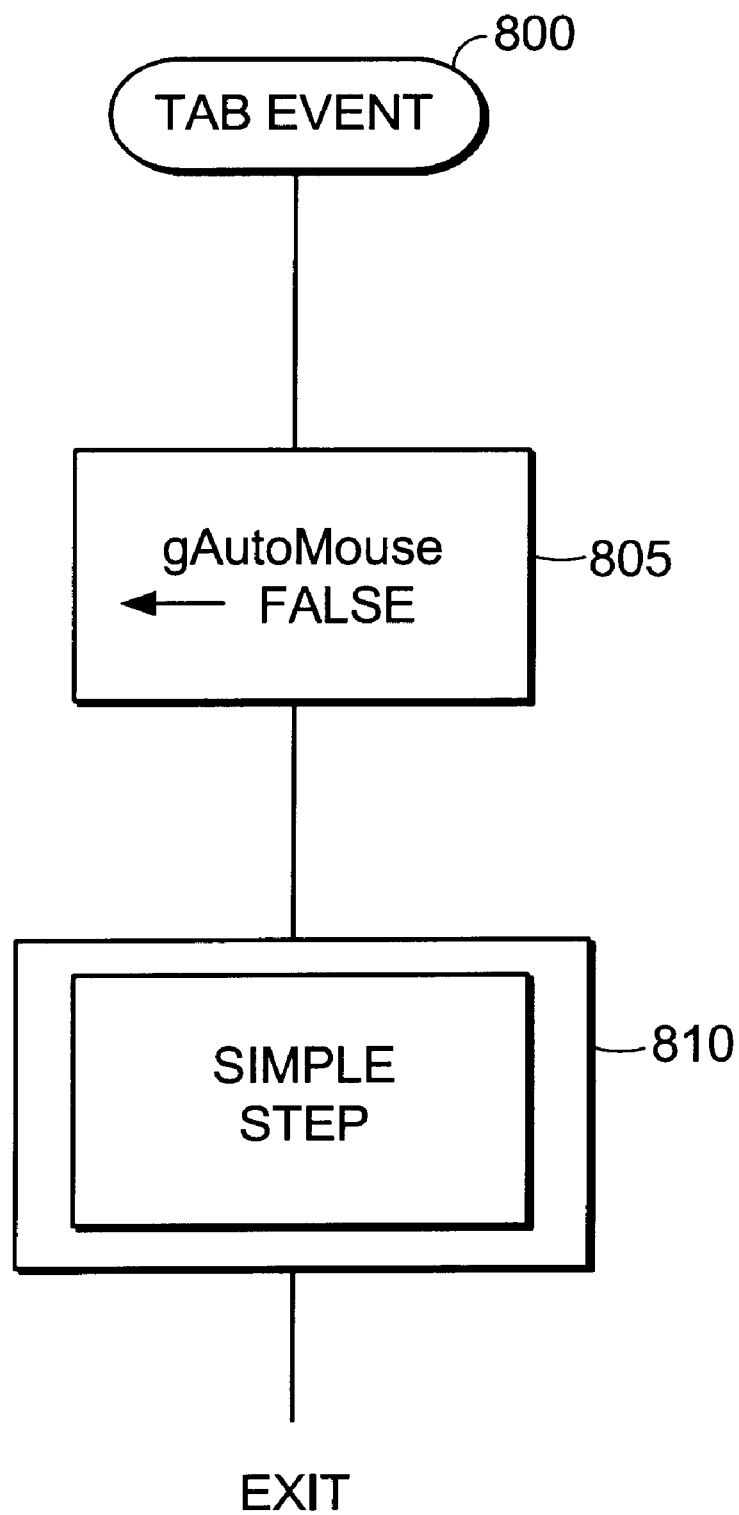
FIG. 18 is a flowchart of a tab event function.

FIG. 18 is a flowchart of a tab event function. The tab event function 600 starts with step 405 where the AutoMouse flag 64 is set to false. Then at step 810, the SimpleStep function is called. Upon return, the tab event function 800 exits.

Figure 19:
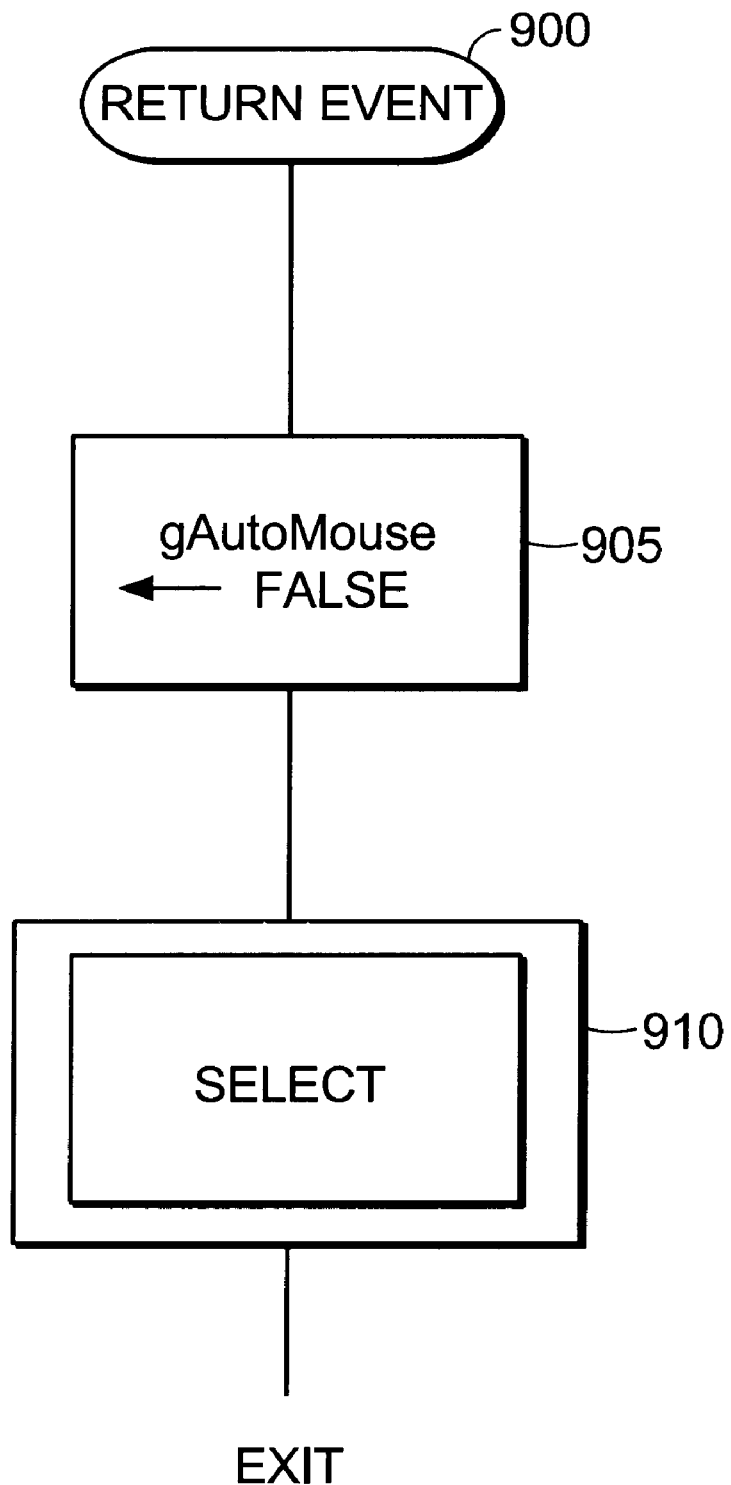
FIG. 19 is a flowchart of a return event function.

FIG. 19 is a flowchart of a return event function. The return event function 900 begins at 905 where the AutoMouse flag 64 is set to false. Then, at step 910, the Select function is called. Upon return, the return event function 900 exits.

Figure 20:
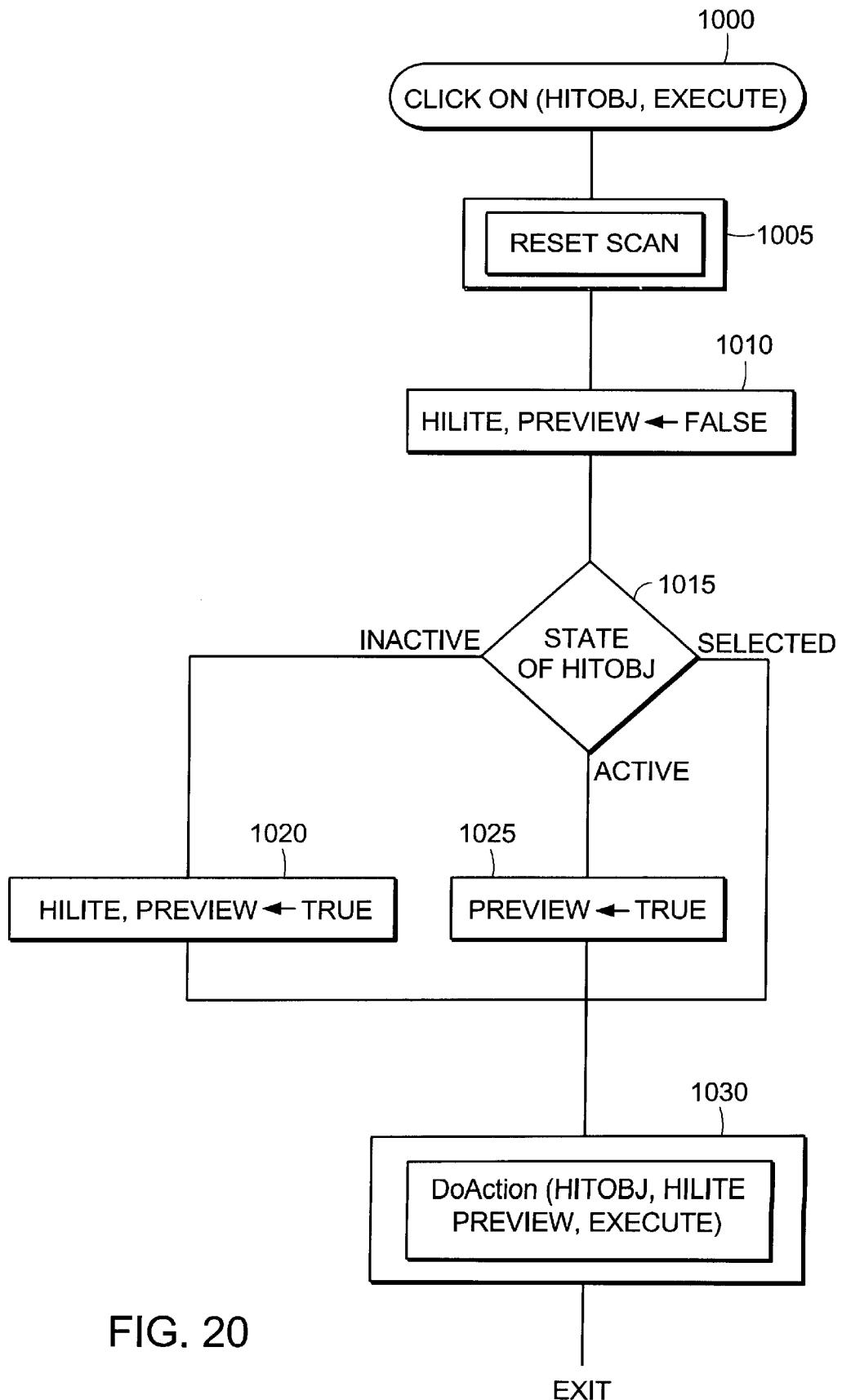
FIG. 20 is a flowchart of a click-on event function.

FIG. 20 is a flowchart of a click-on event function. The click-on function 1000 receives two parameters: the hit object and the execute command. At step 1005, the ResetScan function is called. Upon return, processing continues to step 1010 where highlight and preview flags are set to false. At step 1015, the state of the hit object is determined. If the state of the hit object is "selected", then processing jumps to step 1030. If the state of the hit object is "inactive", then processing continues to step 1020 where the highlight and preview flags are set to true and processing then continues to step 1030. If the state of the hit object is "active", then processing continues to step 1025 where the preview flag is set to true and processing continues to step 1030.

At step 1030, the DoAction function is called passing the hit object, the highlight flag, the preview flag and the execute flag. Upon return, the click-on function 1000 exits.

Table II below shows the mapping of events to scan events: (STEP, AUTO)—(ZERO, ONE, TWO). A ZERO is a no event that needs to be handled as a scan event. A ONE generally corresponds to a press of a key designated as stepping or starting auto scan (preferably "1"). A TWO generally corresponds to a press of a key designated as executed or stopping auto scan (preferably "2"). Any case not specified in Table II is not handled as a scan event.

TABLE II

|  | Null Event | Key Down Event "1" | Key Down Event "2" |
| --- | --- | --- | --- |
| 1 Switch Step Scan | STEP-ZERO, if have an active group | STEP-ONE | n/a |
| 2 Switch Step Scan | STEP-ZERO, if dwell for preview and have an active group | STEP-ONE | STEP-Two |
| 1 Switch Auto Scan | AUTO-ZERO, if auto scan active | AUTO-ONE, if auto scan not active | n/a |
| 2 Switch Auto Scan | AUTO-ZERO, if | AUTO-ONE, if | AUTO-TWO, if |

TABLE II-continued

| Auto Scan | auto scan active | auto scan not active | auto scan active |
| --- | --- | --- | --- |
|  | Null Event |  | Key Up Event "1" |
| Morse Step Scan | STEP-ZERO, if dwell for preview and have an active group |  | STEP-ONE, if time down < morse key pref STEP-TWO, otherwise |
| Morse Auto Scan | AUTO-ZERO, if auto scan active |  | AUTO-ONE, if time down < morse key pref AUTO-TWO, otherwise if auto scan active |

The STEP-ZERO event function calls the check mouse movement event function 400 and exits. The STEP-ONE event function sets the AutoMouse flag 64 to false, and calls the Step function, and then exits. The STEP-TWO event function sets the AutoMouse flag 69 to false, calls the Select function, and then exits.

FIGS. 21A–21D are flowcharts of an AUTO-ZERO event function. The auto-zero event function 1100 first calls the check mouse movement function 400 at step 1105. If the mouse has moved, processing exits; otherwise, if the mouse did not move, processing continues to step 1110. At step 1110, the current time minus the auto scan start (AutoStart) time 74 is compared to the scan rate setting chosen by the user. If within the scan rate, processing continues to step 1115 where the cursor is set, and processing exits. If outside the scan rate, then processing continues to step 1120.

At step 1120, the Step function is called. If the cursor is at the rest stop, processing jumps to step 1125. Otherwise, processing jumps to step 1150.

At step 1125 the AutoCycles counter 75 is incremented and processing continues to step 1130. At step 1130, the AutoCycles counter 75 is compared with the number of scan cycles chosen by the user. If the AutoCycles counter 75 is the lesser number, processing jumps to step 1150. Otherwise processing continues to step 1135 where the ResetScan function is called. Upon return, at step 1140, the ResetDwell function is called. Upon return, processing exits.

At step 1150, the AutoStart time 74 is set to the current time. At step 1155 the cursor is set and processing exits.

Figure 21A:
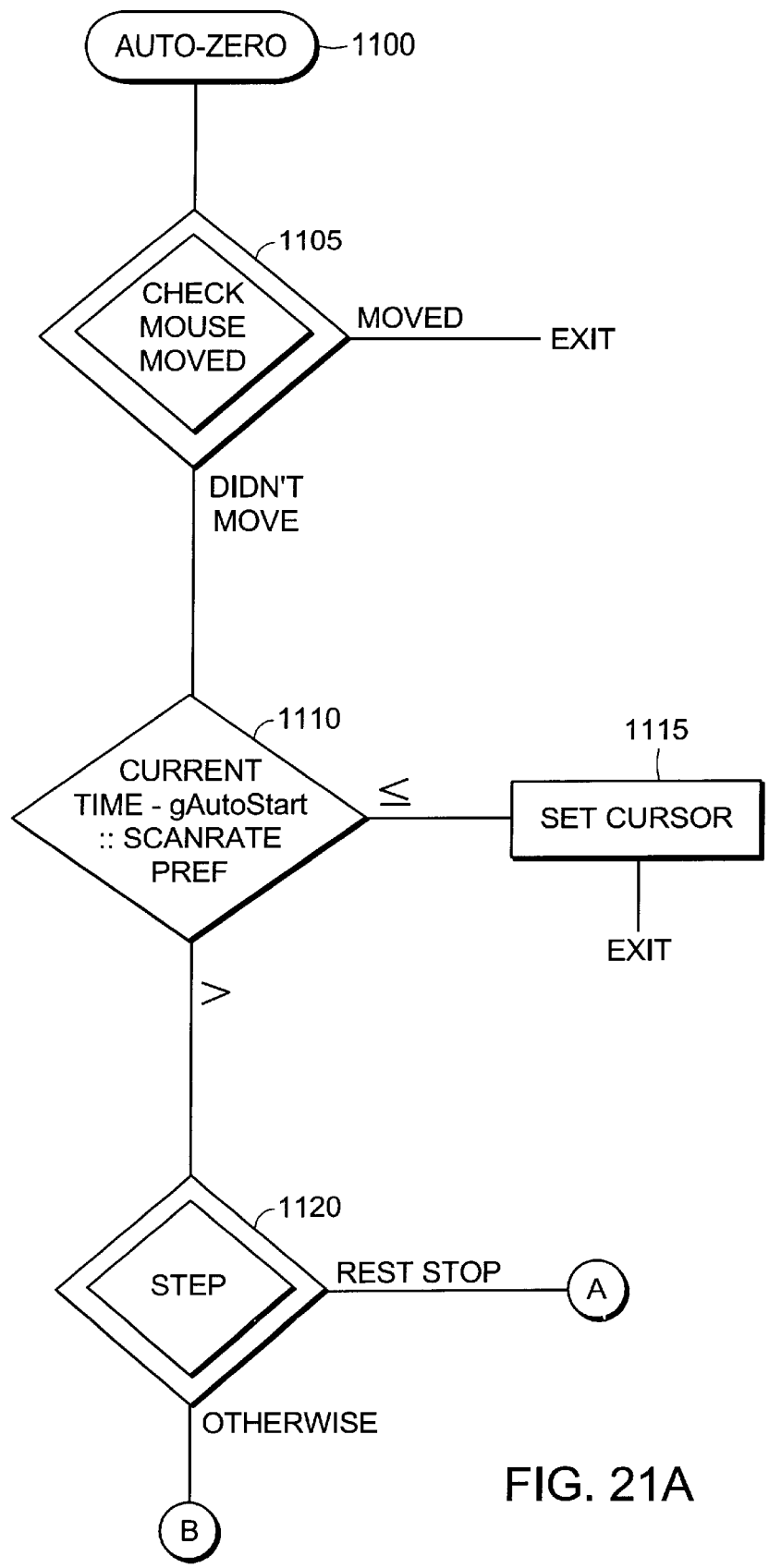
FIGS. 21A–21D are flowcharts of auto-zero, auto-one, and auto-two event functions.
Figure 21B:
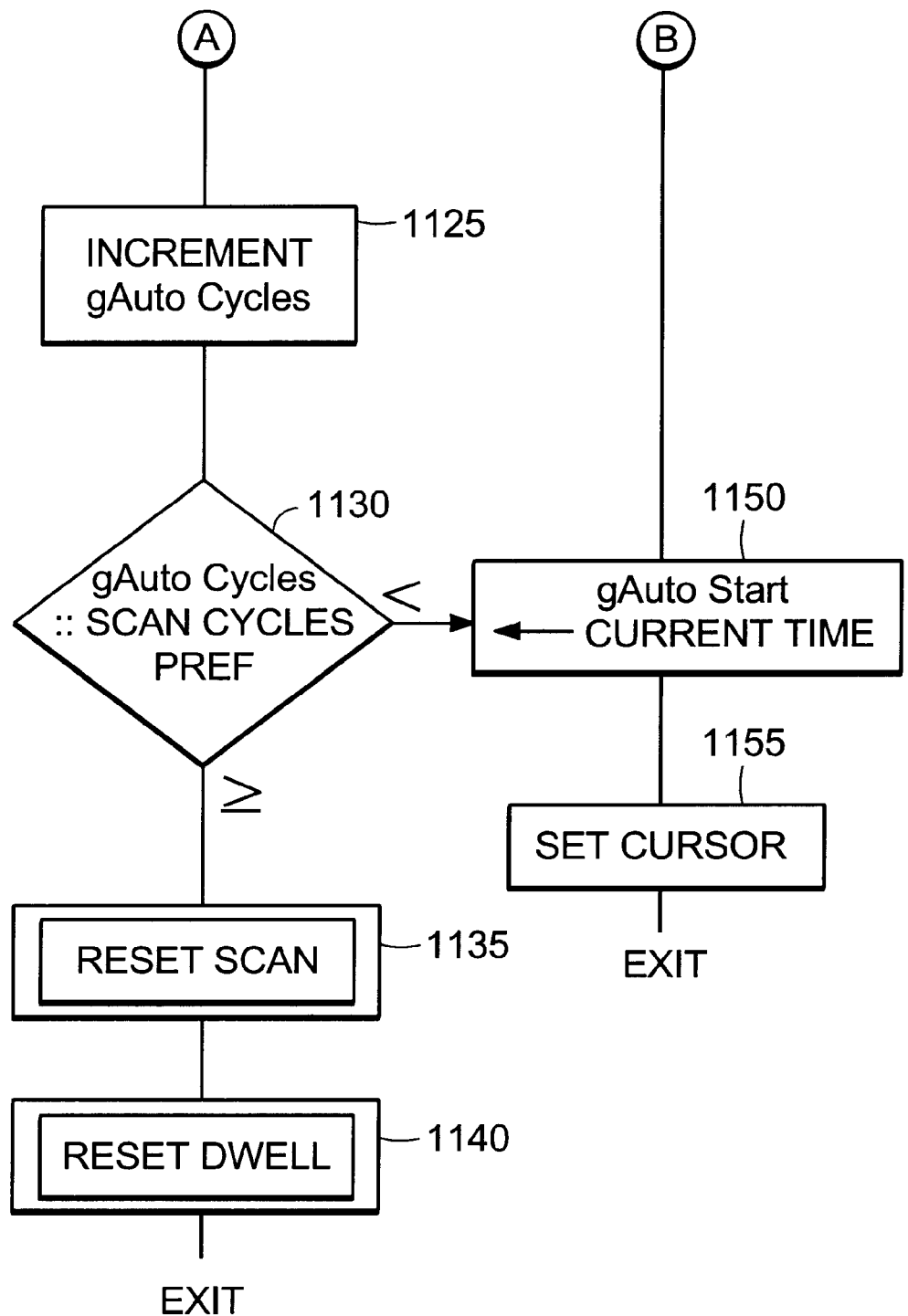
Figure 21C:
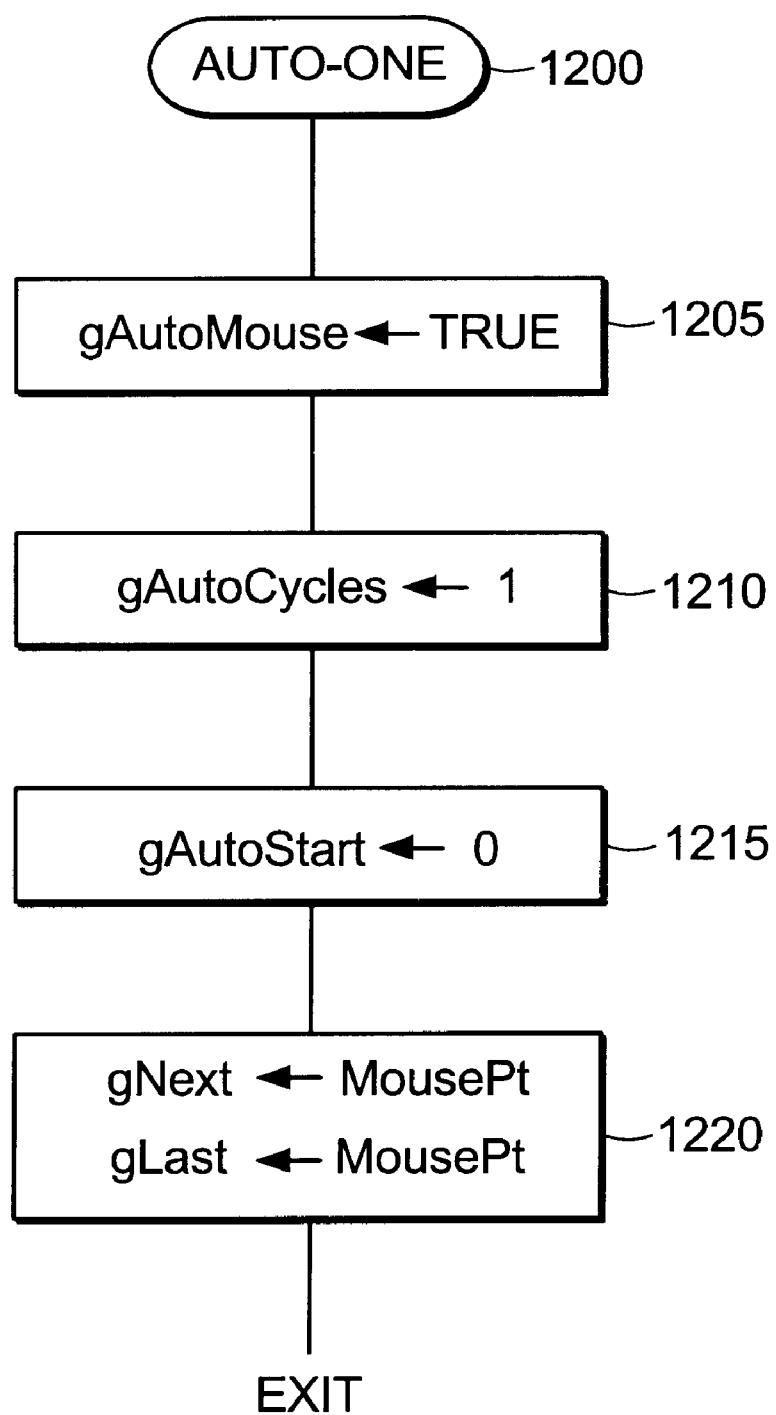

FIG. 21C is a flowchart of an AUTO-ONE event function 1200. At step 1210, the AutoCycles counter 75 is set to one. At step 1215, the AutoStart time 74 is initialized to zero. At step 1220, the next mouse position (Next) 71 and the last mouse position (Last) 72 are set to the current mouse position (MousePt) 84. Processing then exits.

Figure 21D:
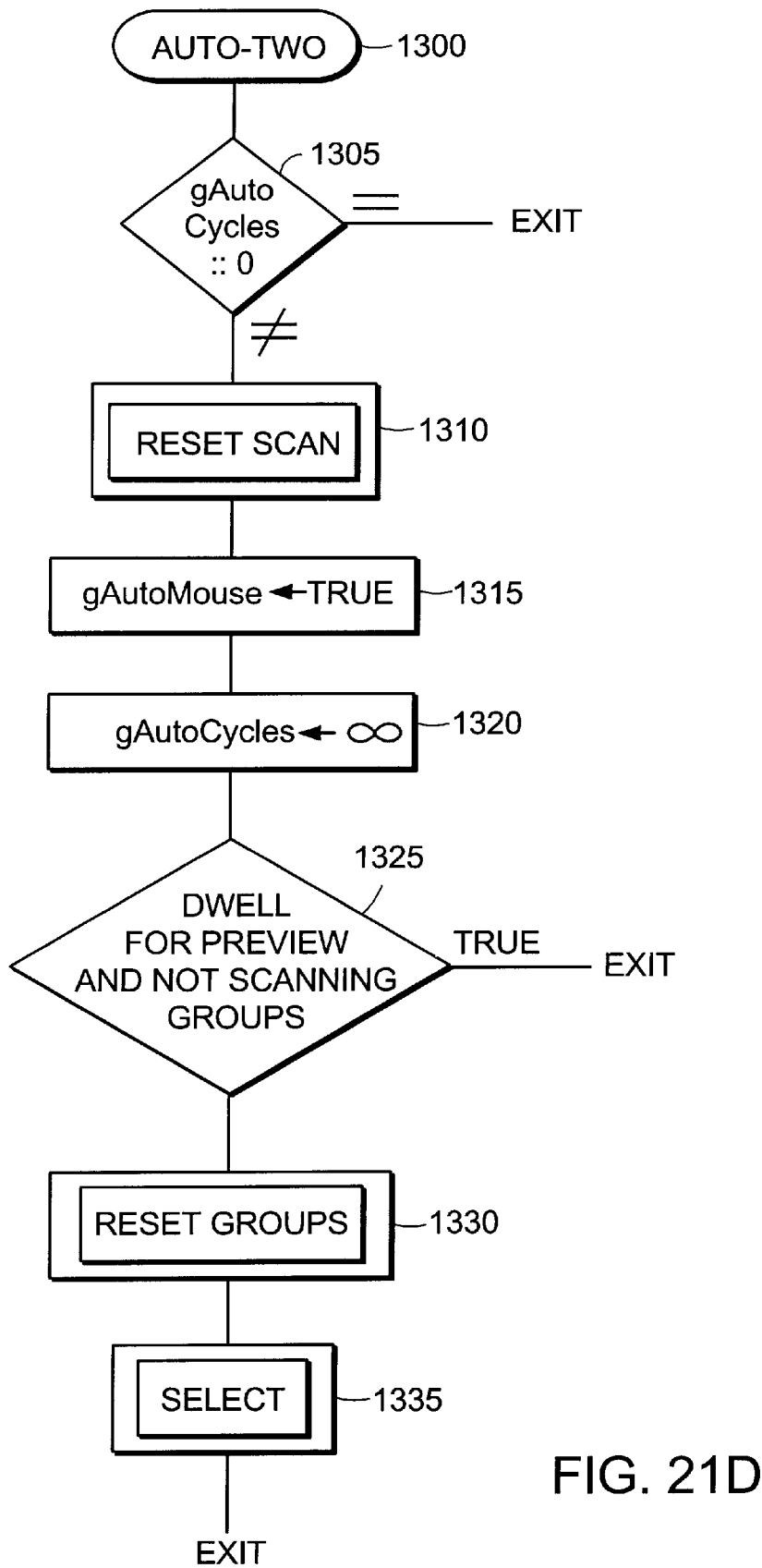

FIG. 21D is a flowchart of an AUTO-TWO event function 1300. At step 1305 the AutoCycles counter is compared with zero. If the AutoCycles counter equals zero, then processing exits. Otherwise processing continues to step 1310.

At step 1310, the Reset Scan function is called. Upon return, the AutoMouse flag 64 is set to true at step 1315 and the AutoCycles counter 75 is set to a large number at step 1320. Processing then continues to step 1325.

At step 1325, a determination is made for whether there is currently a dwell for preview and not scanning of groups. If this is true, processing exits; otherwise processing continues to step 1330. At step 1330, a Reset Groups function is called. Upon return, the Select function is called at step 1335. Upon return, processing exits.

In addition to the authoring tool capabilities, the AAC software includes a universally accessible virtual keyboard that can be used with the AAC software or any other application on the general purpose computer. A patch to the operating system (e.g., the Text Edit Manager) causes the virtual keyboard to pop open whenever the user selects a text box requiring input. The virtual keyboard also opens when a dialog box appears so that scan users can select letters and arrow keys to select or name a file. When not in use, the accessible keyboard can be iconified to an icon on the computer desktop.

Once the virtual keyboard is iconified, it can be reopened (deiconified) at any time by:
 clicking on it once with a mouse;
 Touching it once when using a touchscreen;
 With an alternative pointer, dwelling on the keyboard icon with the pointer for a user-configurable time period, preferredly three seconds.
 Using a switch, hitting the switch that sends "1" key three times in quick succession.

Figure 22A:
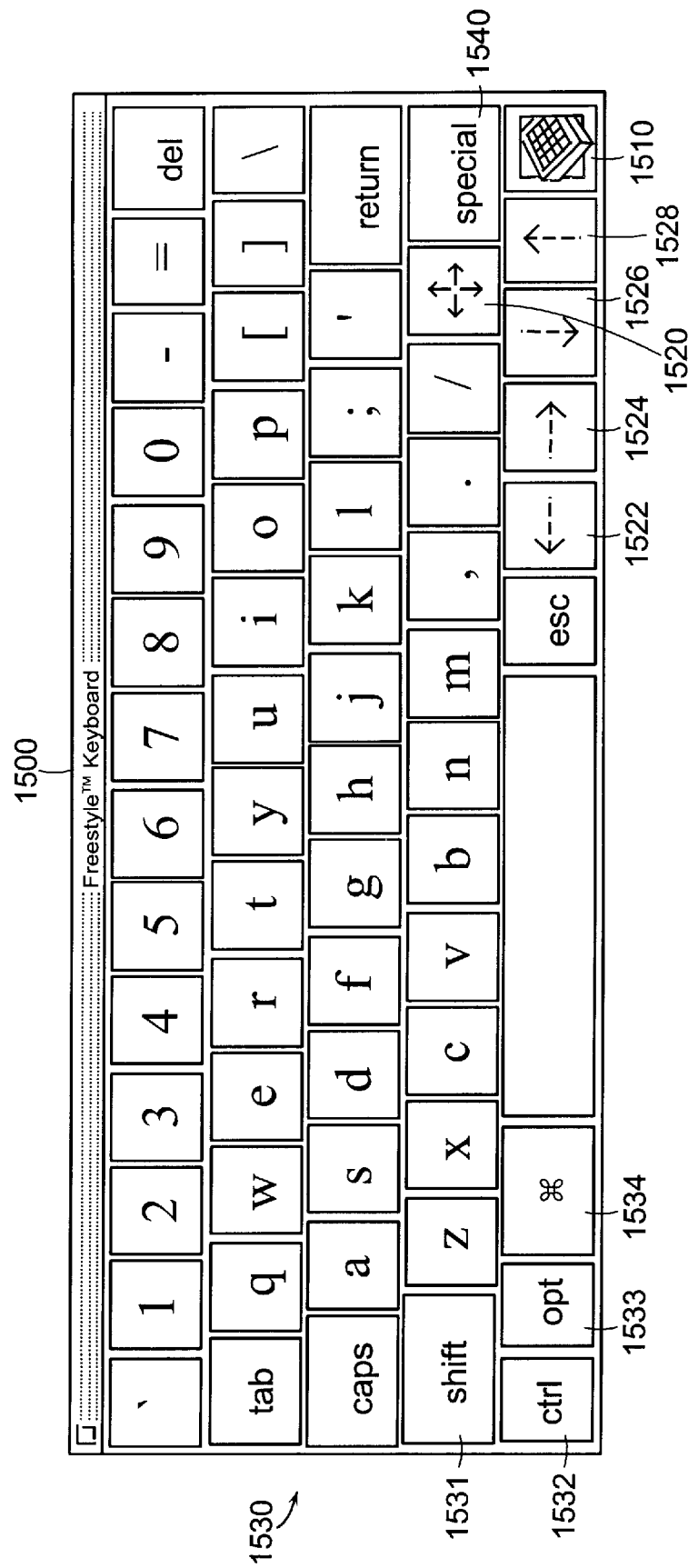
FIGS. 22A–22C are screen views of a de-iconified virtual keyboard in accordance with a preferred embodiment of the invention.
Figure 22B:
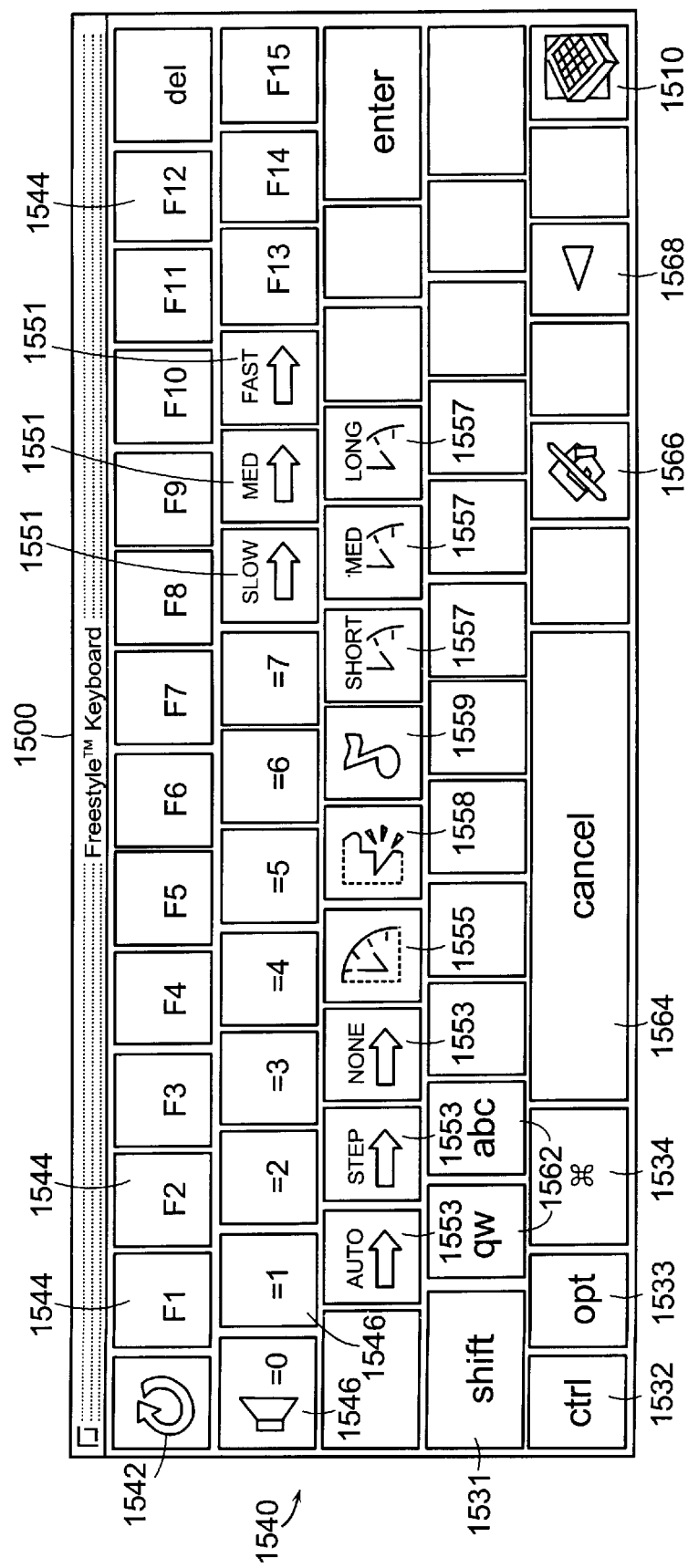
Figure 22C:
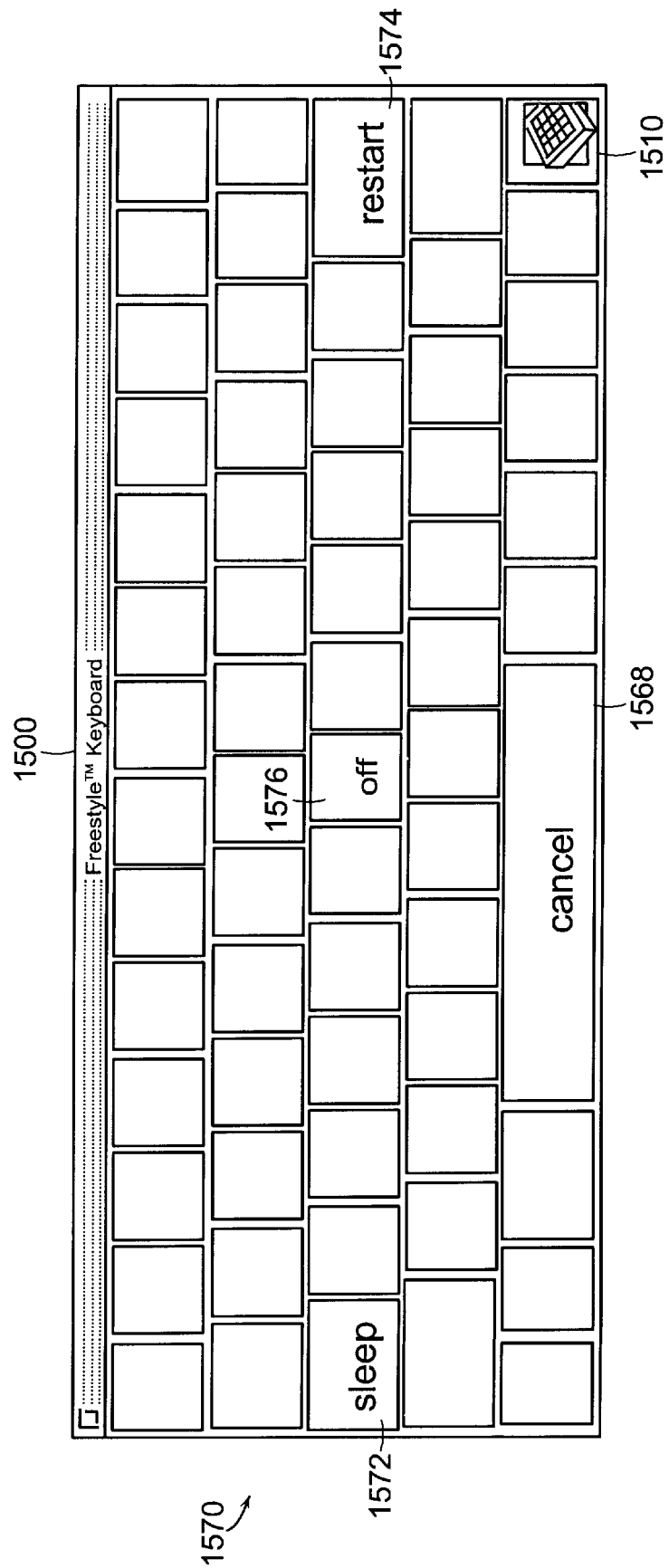

FIGS. 22A–22C are screen views of a de-iconified virtual keyboard in accordance with a preferred embodiment of the invention. Because the keyboard 1500 is virtual, the key layout and characteristics can be modified from the example illustrated. For example, a user can create a custom keyboard by dragging and dropping characters from a palette.

The user enters text by clicking, touching, pointing, or scanning to the keys. The keys are grouped for scanning by rows, by half rows, then by individual keys. For example, user can hit the switch to start scanning; hit the switch again when the row having the desired key is highlighted; hit the switch to choose the half row having the desired key; and then hit the switch again to select the desired key.

FIG. 22A illustrates a QWERTY key arrangement 1530. As will be described below, the user can alternatively select an alphabetical key arrangement. Other alternatives can also be displayed. Certain keys are particularly noteworthy.

An iconify key 1510 is provided to reduce the virtual keyboard 1500 to an icon on the desktop. To facilitate use, the virtual keyboard 1500 is relatively large compared to the standard display. The keyboard can be moved by selection of a keyboard move key 1520, followed by a direction key 1522, 1524, 1526, 1528. Other modifier keys 1531, 1532, 1533, 1534 work in combination with subsequently selected keys to form an ASCII key code or a command. In addition, a "special" key 1540 permits limited control of the AAC software from the virtual keyboard.

If the user selects a modifier key 1520, 1531, 1532, 1533, 1534, that key remains darkened, as if pressed, until the user enters the key it is to act on. The characters displayed on the virtual keyboard buttons change to reflect the new options, where applicable. For example, to enter a dollar sign, the user would serially selects the shift key 1531, which causes the virtual keyboard 1500 to be redrawn with shifted keys, and then the dollar sign key from the top row. Users can select multiple modifier keys 1531, 1532, 1533, 1534 in a serial fashion, allowing special characters that require combination key strokes. Details of implementing the modifier key functionality are described below.

When the user presses the option key 1533, accent keys are displayed with a colored (e.g., red) border. These keys allow the user to enter accents and other diacritical marks for foreign language text.

In addition to the standard letter, number, and modifier keys, extra keys and functions are available in a special layout. The special layout can be selected by pressing the key labeled "special" 1540.

FIG. 22B illustrates the virtual keyboard in its special mode. A cycle key 1542 switches among open applications. Function keys (F1–F15) 1544 are treated as standard function keys. Volume keys 1546 adjust the volume of internal speakers.

In addition, preference keys alter the AAC software. Scan rate keys 1551 select a slow, medium or fast scan rate for the virtual keyboard. Scan mode keys 1553 select automatic scan, step scan, or no scan. A dwell key 1555 toggles dwell on or off and dwell-time keys 1557 adjust the dwell time to be short, medium or long. A speak key 1558 toggles on or off the speaking of the key names as selected. Sound feedback is toggled on or off using the feedback key 1559. In addition, the keyboard key layout can be altered by the layout keys 1562.

Furthermore, a cancel key 1564 cancels the special keyboard and returns the user to the main keyboard (FIG. 22A). A quit key 1566 quits from the current application. A shutdown key 1568 takes the user to a shutdown keyboard layout.

FIG. 22C illustrates the virtual keyboard in its shutdown mode. Here, the virtual keys 1570 include a sleep key 1572 to put the computer in its sleep mode, a restart key 1574 to reboot the computer, and an off key 1576 to shutdown the computer. The cancel key 1564 cancels the shutdown keyboard and returns the user to the special keyboard (FIG. 22B). By employing a separate virtual keyboard, a severely handicapped user, who may have essentially no mobility, can have access to a mechanism to shutdown the computer.

Figure 23:
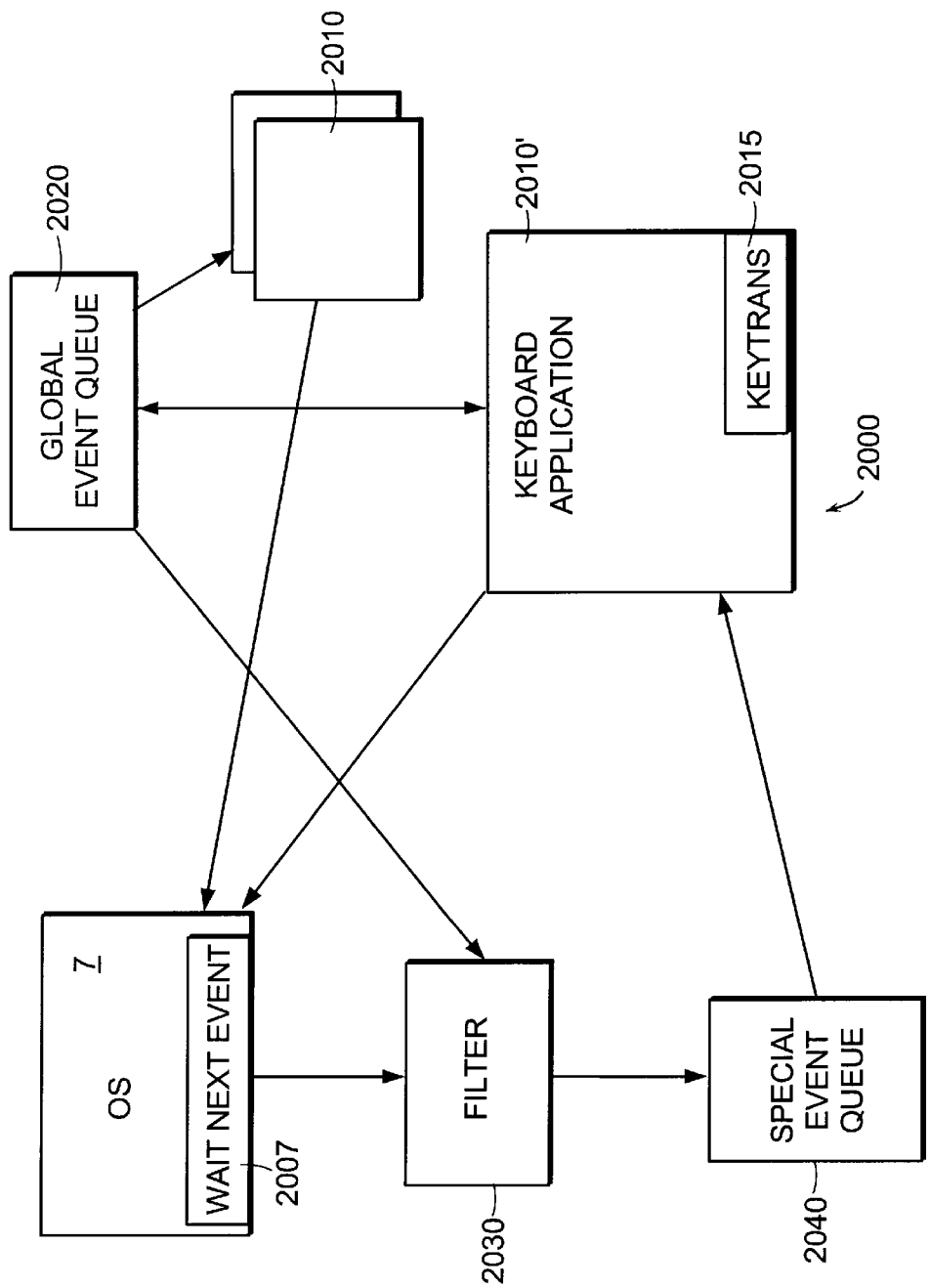
FIG. 23 is a schematic block diagram of a preferred system for implementing the modifier keys of the virtual keyboard.

FIG. 23 is a schematic block diagram of a preferred system for implementing the modifier keys of the virtual keyboard. The key modifier system 2000 includes the operating system 7 of FIG. 1 having a WaitNextEvent function 2007. The WaitNextEvent function 2007 is called by application programs 2010, such as a keyboard application 2010', which includes a key translation (KeyTrans) function 2015. The applications all have access to data in the system's global event queue 2020. The KeyTrans function 2015 translates a virtual key code in combination with any saved modifier state to display characters.

The WaitNextEvent function 2007 calls a filter routine 2030 to modify an event. The event is received by the filter 2030 from the global event queue 2020 as a message field, which in a particular preferred embodiment of the invention is stored at a unique Apple Desktop Bus (ADB) address. Specifically, the virtual keyboard is assigned ADB address 15. The modified event is stored in a special event queue 2040 for access by the keyboard application 2010'.

Figure 24:
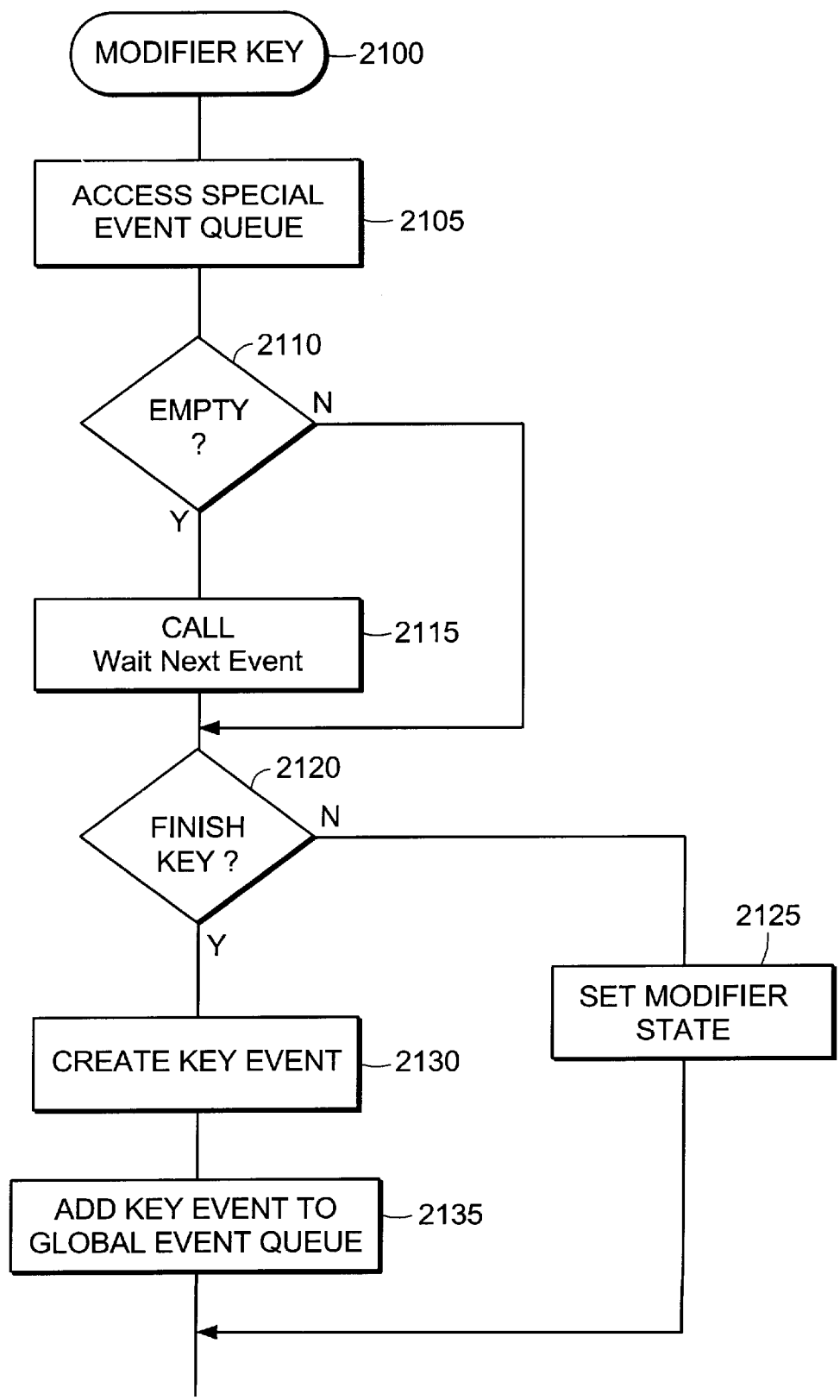
FIG. 24 is a flowchart of a key modifier function operating in the application 2010 of FIG. 23.

FIG. 24 is a flowchart of a key modifier function operating in the keyboard application 2010' of FIG. 23. The key modifier function 2100 accesses the special event queue 2040 at step 2105. At step 2110, if the special event queue is empty, processing continues to step 2115 to get an event; otherwise processing jumps to stop 2120.

At step 2115, the WaitNextEvent function 2007 is called. Upon return, the WaitNextEvent function 2007 passes back the top event popped from the global event queue 2020.

At step 2120, the function checks to see if the returned event is a finish key for a modifier. If not, then a modifier state is set at step 2125 and processing exits. Otherwise, processing continues to step 2130, where a key event (up or down) is created. The key event is then added to the global event queue 2020 at step 2135 and processing exits.

Figure 25:
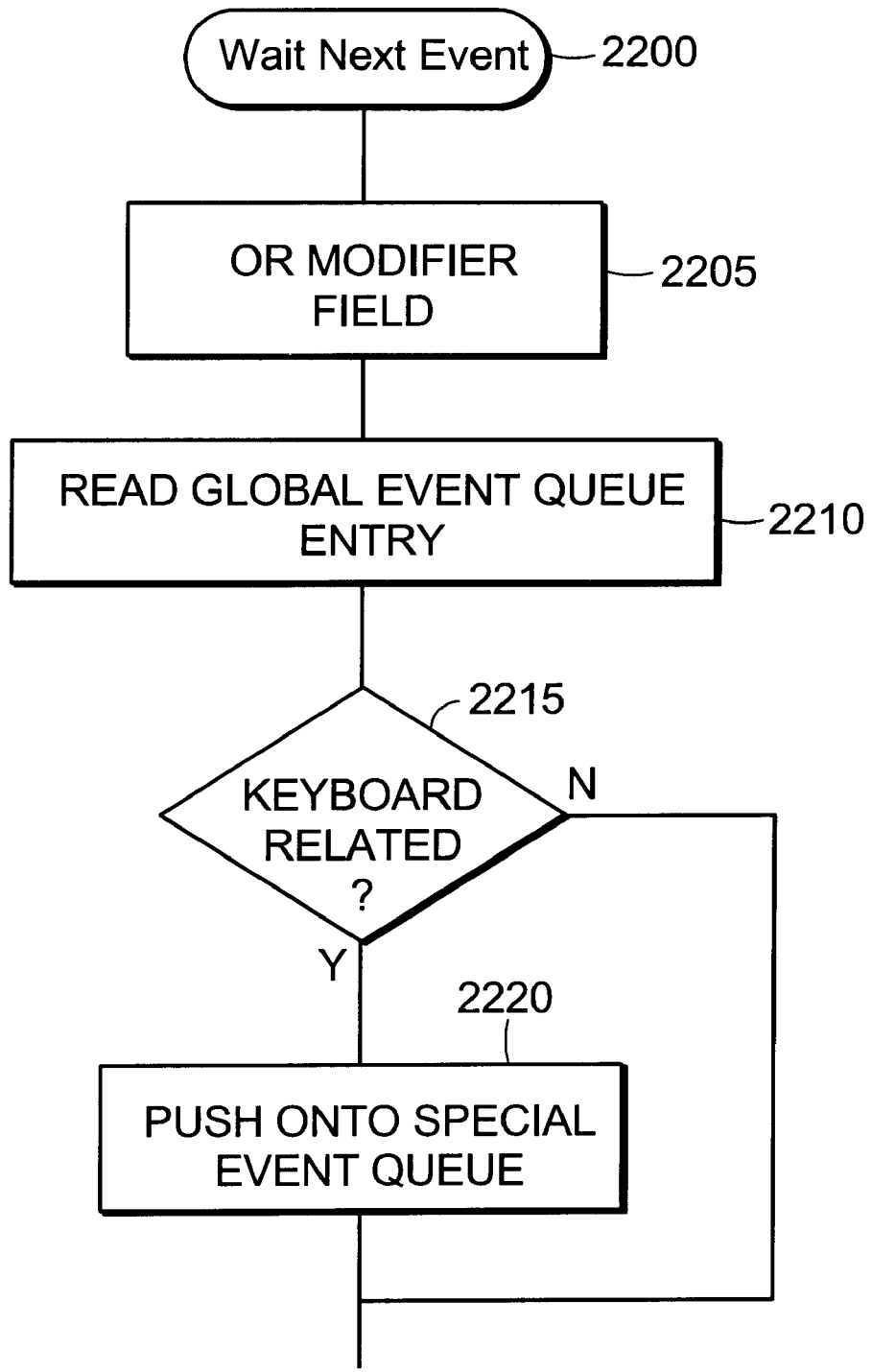
FIG. 25 is a flowchart of the filter function 2030 of FIG. 23.

FIG. 25 is a flowchart of the filter function 2030 of FIG. 23. At step 2205, the filter 2030 first takes the modifier state from the application and OR's it with the existing modifier field received from the global event queue. At step 2210, the filter 2030 checks the global event queue entry to'see if the event is keyboard related. If so, then processing continues to step 2220; else the function exits. At step 2220, the OR'ed event record is put into the special event queue. On return to the WaitNextEvent function 2005, the event is popped from the global event queue 2020.

Figure 26:
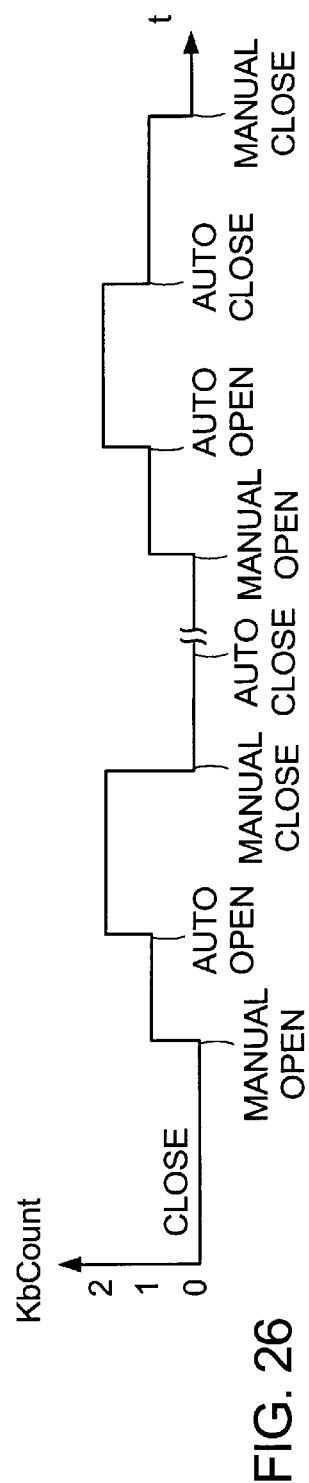
FIG. 26 is a schematic diagram of state transitions for the virtual keyboard.

FIG. 26 is a schematic diagram of state transitions for the virtual keyboard. As illustrated there are only two states for the virtual keyboard 1500: open and close. The virtual keyboard, however, can be manually opened or closed by the user or automatically opened or closed by an application. A keyboard open counter (kbCount) is maintained to count the number of times the virtual keyboard has been opened.

As illustrated, whenever the keyboard is opened, the kbCount value is incremented. This is true regardless of how the keyboard is opened. When the keyboard is closed, however, it does matter how the keyboard is closed. An automatic close decrements the value of kbCount, as shown. A manual close overrides all pending opens and resets the kbCount value to zero. Subsequent automatic closes are ignored and do not further decrement the kbCount value.

Equivalents

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method of operating a computer having an object structure accessible by a user to trigger an action, the action dependent on a type of user access, the method comprising:
    associating an announce bin with the object structure, the announce bin defined to store a plurality of announce actions triggerable by an announcement-type access by the user;
    associating a preview bin with the object structure, the preview bin defined to store a plurality of preview actions triggerable by a preview-type access by the user;
    associating an execute bin with the object structure, the execute bin defined to store a plurality of execute actions triggerable by an execute-type access by the user; and
    storing a plurality of actions in at least one of the bins.

2. The method of claim 1 wherein storing a plurality of actions in a bin comprises storing an ordered list of actions.

3. The method of claim 1 further comprising merging actions stored in a plurality of bins upon an access of the object structure by the user.

4. The method of claim 1 further comprising assigning a plurality of object structures to an environment structure.

5. The method of claim 4 further comprising displaying a representation of the environment stricture to the user on a display device, each object structure assigned to the environment being represented by an icon, each icon drawn on the environment in accordance with a draw order stored in the environment structure.

6. The method of claim 5 further comprising assigning a background image to the environment structure.

7. The method of claim 6 further comprising creating a new environment by copying a displayed background image to a displayed object.

8. The method of claim 5 further comprising scanning the displayed icons in accordance with a scan order stored in the environment structure.

9. The method of claim 8 further comprising grouping a plurality of icons together to form a scan group of object structures.

10. The method of claim 1 further comprising editing object structures through an environment structure.

11. The method of claim 1 further comprising editing system preferences through an environment structure.

12. The method of claim 1 further comprising accessing the object structures by an input switch device.

13. The method of claim 1 wherein the announce action include a statically-defined automatic action.

14. The method of claim 1 further comprises triggering a preview action from the preview bin in response to an execute-type access to an empty execute bin.

15. A computing system having an object structure accessible by a user to trigger an action, the action dependent on a type of user access, the system comprising:
    an announce bin associated with the object structure, the announce bin defined to store a plurality of announce actions triggerable by an announcement-type access by the user;
    a preview bin associated with the object structure, the preview bin defined to store a plurality of preview actions triggerable by a preview-type access by the user;
    an execute bin associated with the object structure, the execute bin defined to store a plurality of execute actions triggerable by an execute-type access by the user; and
    storing a plurality of actions in at least one of the bins.

16. The system of claim 15 the plurality of actions stored in a bin are stored as an ordered list of actions.

17. The system of claim 15 further comprising a mechanism to merge actions stored in a plurality of bins upon an access of the object structure by the user.

18. The system of claim 15 further comprising a plurality of object structures assigned to an environment structure.

19. The system of claim 18 further comprising a display device displaying a representation of the environment structure to the user, each object structure assigned to the environment being represented by an icon, each icon drawn on the environment in accordance with a draw order stored in the environment structure.

20. The system of claim 19 further comprising a background image assigned to the environment structure.

21. The system of claim 20 further comprising a new environment derived from a displayed background image copied to a displayed object.

22. The system of claim 19 further comprising a mechanism to scan the displayed icons in accordance with a scan order stored in the environment structure.

23. The system of claim 22 further comprising a plurality of icons grouped together to form a scan group of object structures.

24. The system of claim 15 further comprising an editor to edit object structures through an environment structure.

25. The system of claim 15 further comprising a mechanism to edit system preferences through an environment structure.

26. The system of claim 15 further comprising an input switch device for accessing the object structures.

27. The system of claim 15 wherein the announce action includes a statically-defined automatic action.

28. The system of claim 15 wherein the execute bin is empty and a preview action from the preview bin is triggered by an execute-type access.

29. An article of manufacture comprising:
    a computer-readable medium;
    a computer program stored in the medium, the program including a method of operating a computer having an object structure accessible by a user to trigger an action, the action dependent on a type of user access, the method comprising:

associating an announce bin with the object structure, the announce bin defined to store a plurality of announce actions triggerable by an announcement-type access by the user;

associating a preview bin with the object structure, the preview bin defined to store a plurality of preview actions triggerable by a preview-type access by the user;

associating an execute bin with the object structure, the execute bin defined to store a plurality of execute actions triggerable by an execute-type access by the user; and storing a plurality of actions in at least one of the bins.

30. The article of claim 29 wherein storing a plurality of actions in a bin comprises storing an ordered list of actions.

31. The article of claim 29 wherein the method further comprises merging actions stored in a plurality of bins upon an access of the object structure by the user.

32. The article of claim 29 wherein the method further comprises assigning a plurality of object structures to an environment structure.

33. The article of claim 32 wherein the method further comprises displaying a representation of the environment structure to the user on a display device, each object structure assigned to the environment being represented by an icon, each icon drawn on the environment in accordance with a draw order stored in the environment structure.

34. The article of claim 33 wherein the method further comprises assigning a background image to the environment structure.

35. The article of claim 34 wherein the method further comprises creating a new environment by copying a displayed background image to a displayed object.

36. The article of claim 33 wherein the method further comprises scanning the displayed icons in accordance with a scan order stored in the environment structure.

37. The article of claim 36 wherein the method further comprises grouping a plurality of icons together to form a scan group of object structures.

38. The article of claim 29 wherein the method further comprises editing object structures through an environment structure.

39. The article of claim 29 wherein the method further comprises editing system preferences through an environment structure.

40. The article of claim 29 wherein the method further comprises accessing the object structures by an input switch device.

41. The article of claim 29 wherein the announce action includes a statically-defined automatic action.

42. The article of claim 29 wherein the method further comprises triggering a preview action from the preview bin in response to an execute-type access to an empty execute bin.

43. A method of operating a computer having an object structure accessible by a user to trigger an action, the action dependent on a type of user access, the method comprising:

in an announce bin, storing an announce action associated with the object structure and triggerable by an announcement-type access by the user;

in a preview bin, storing a preview action associated with the object structure and triggerable by a preview-type access by the user;

in an execute bin, storing an execute action associated with the object structure and triggerable by an execute-type access by the user; and merging actions stored in a plurality of bins upon an access of the object structure by the user.

44. The method of claim 43 wherein storing comprises storing a plurality of actions in at least one of the bins.

45. The method of claim 44 wherein storing comprises storing a plurality of actions as an ordered list.

46. The method of claim 43 further comprising assigning a plurality of object structures to an environment structure.

47. The method of claim 46 further comprising displaying a representation of the environment structure to the user on a display device, each object structure assigned to the environment being represented by an icon, each icon drawn on the environment in accordance with a draw order stored in the environment structure.

48. The method of claim 47 further comprising assigning a background image to the environment structure.

49. The method of claim 48 further comprising creating a new environment by copying a displayed background image to a displayed object.

50. The method of claim 47 further comprising scanning the displayed icons in accordance with a scan order stored in the environment structure.

51. The method of claim 50 further comprising grouping a plurality of icons together to form a scan group of object structures.

52. The method of claim 43 further comprising editing object structures through an environment structure.

53. The method of claim 43 further comprising editing system preferences through an environment structure.

54. The method of claim 43 further comprising accessing the object structures by an input switch device.

55. The method of claim 43 wherein the announce action includes a statically-defined automatic action.

56. A computing system having an object structure accessible by a user to trigger an action, the action dependent on a type of user access, the system comprising:

an announce bin having stored therein an announce action associated with the object structure and triggerable by an announcement-type access by the user;

a preview bin having stored therein a preview action associated with the object structure and triggerable by a preview-type access by the user;

an execute bin having stored therein an execute action associated with the object structure and triggerable by an execute-type access by the user;

a mechanism to merge actions stored in a plurality of bins upon an access of the object structure by the user.

57. The system of claim 56 wherein a plurality of actions are stored in at least one of the bins.

58. The system of claim 57 wherein the plurality of actions are stored as an ordered list.

59. The system of claim 56 wherein a plurality of object structures are assigned to an environment structure.

60. The system of claim 59 further comprising a display device displaying a representation of the environment structure to the user, each object structure assigned to the environment being represented by an icon, each icon drawn on the environment in accordance with a draw order stored in the environment structure.

61. The system of claim 60 further comprising a background image assigned to the environment structure.

62. The system of claim 61 further comprising a new environment based on a displayed background image copied to a displayed object.

63. The system of claim 60 further comprising a mechanism to scan the displayed icons in accordance with a scan order stored in the environment structure.

64. The system of claim 63 further comprising a plurality of icons grouped together to form a scan group of object structures.

65. The system of claim 56 further comprising an editor to edit object structures through an environment structure.

66. The system of claim 56 further comprising mechanism to an edit system preferences through an environment structure.

67. The system of claim 56 further comprising an input switch device for accessing the object structures.

68. The system of claim 56 wherein the announce action includes a statically-defined automatic action.

69. An article of manufacture comprising:
a computer-readable medium;
a computer program stored in the medium, the program including a method of operating a computer having an object structure accessible by a user to trigger an action, the action dependent on a type of user access, the method comprising the steps of:
in an announce bin, storing an announce action associated with the object structure and triggerable by an announcement-type access by the user;
in a preview bin, storing a preview action associated with the object structure and triggerable by a preview-type access by the user;
in an execute bin, storing an execute action associated with the object structure and triggerable by an execute-type access by the user; and
merging actions stored in a plurality of bins upon an access of the object structure by the user.

70. The article of claim 69 wherein storing an action comprises storing a plurality of actions in at least one of the bins.

71. The article of claim 70 wherein storing a plurality of actions comprises storing a plurality of actions as an ordered list.

72. The article of claim 69 wherein the method further comprises assigning a plurality of object structures to an environment structure.

73. The article of claim 72 wherein the method further comprises displaying a representation of the environment structure to the user on a display device, each object structure assigned to the environment being represented by an icon, each icon drawn on the environment in accordance with a draw order stored in the environment structure.

74. The article of claim 73 wherein the method further comprises assigning a background image to the environment structure.

75. The article of claim 74 wherein the method further comprises creating a new environment by copying a displayed background image to a displayed object.

76. The article of claim 73 wherein the method further comprises scanning the displayed icons in accordance with a scan order stored in the environment structure.

77. The article of claim 76 wherein the method further comprises grouping a plurality of icons together to form a scan group of object structures.

78. The article of claim 76 wherein the method further comprises editing object structures through an environment structure.

79. The article of claim 69 wherein the method further comprises editing system preferences through an environment structure.

80. The article of claim 69 wherein the method further comprises accessing the object structures by an input switch device.

81. The article of claim 69 wherein the announce action includes a statically-defined automatic action.

* * * * *